(12) United States Patent
Yamamoto

(10) Patent No.: US 8,320,048 B2
(45) Date of Patent: Nov. 27, 2012

(54) PROJECTION LENS AND PROJECTION-TYPE DISPLAY APPARATUS USING THE LENS

(75) Inventor: Chikara Yamamoto, Saitama (JP)

(73) Assignee: Fujifilm Corporation, Tokyo (JP)

( * ) Notice: Subject to any disclaimer, the term of this patent is extended or adjusted under 35 U.S.C. 154(b) by 114 days.

(21) Appl. No.: 13/079,545

(22) Filed: Apr. 4, 2011

(65) Prior Publication Data
US 2011/0242682 A1   Oct. 6, 2011

(30) Foreign Application Priority Data
Apr. 2, 2010   (JP) .................................. 2010-086578

(51) Int. Cl.
*G02B 9/00* (2006.01)
*G02B 3/02* (2006.01)
*G03B 21/26* (2006.01)
(52) U.S. Cl. .......................... 359/649; 359/708; 353/30
(58) Field of Classification Search .................... 353/30; 359/649, 708, 754, 755, 756, 762, 763, 770
See application file for complete search history.

(56) References Cited

U.S. PATENT DOCUMENTS

| | | | | |
|---|---|---|---|---|
| 7,280,285 | B2 * | 10/2007 | Nagahara et al. | 359/680 |
| 7,289,270 | B2 * | 10/2007 | Yamamoto | 359/649 |
| 7,355,799 | B2 * | 4/2008 | Yamamoto | 359/649 |
| 7,529,033 | B2 | 5/2009 | Yamamoto | |

* cited by examiner

*Primary Examiner* — David N Spector
(74) *Attorney, Agent, or Firm* — Young & Thompson

(57) ABSTRACT

A projection lens includes a first lens having at least an aspheric surface, a second lens having a concave surface facing the reduction side of the projection lens, and having negative refractive power, a third lens, a fourth lens, a fifth lens, a sixth lens having a convex surface facing the reduction side, and having positive refractive power, and the like, which are sequentially arranged from the magnification side of the projection lens. Further, the following formulas (1) and (2) are satisfied:

$$3.5 < Bf/f < 7.5 \quad (1); \text{ and}$$

$$1.2 < |fa/f| < 2.0 \quad (2), \text{where}$$

f: focal length of the entire system of the projection lens,
Bf: back focus in air of the entire system, and
fa: combined focal length of lenses from the second lens to a most-reduction-side lens.

21 Claims, 17 Drawing Sheets

EXAMPLE 1

FIG.4 EXAMPLE 2

FIG.5 EXAMPLE 3

FIG.6 EXAMPLE 3

FIG.7 EXAMPLE 4

FIG.8 EXAMPLE 4

FIG.9 EXAMPLE 5

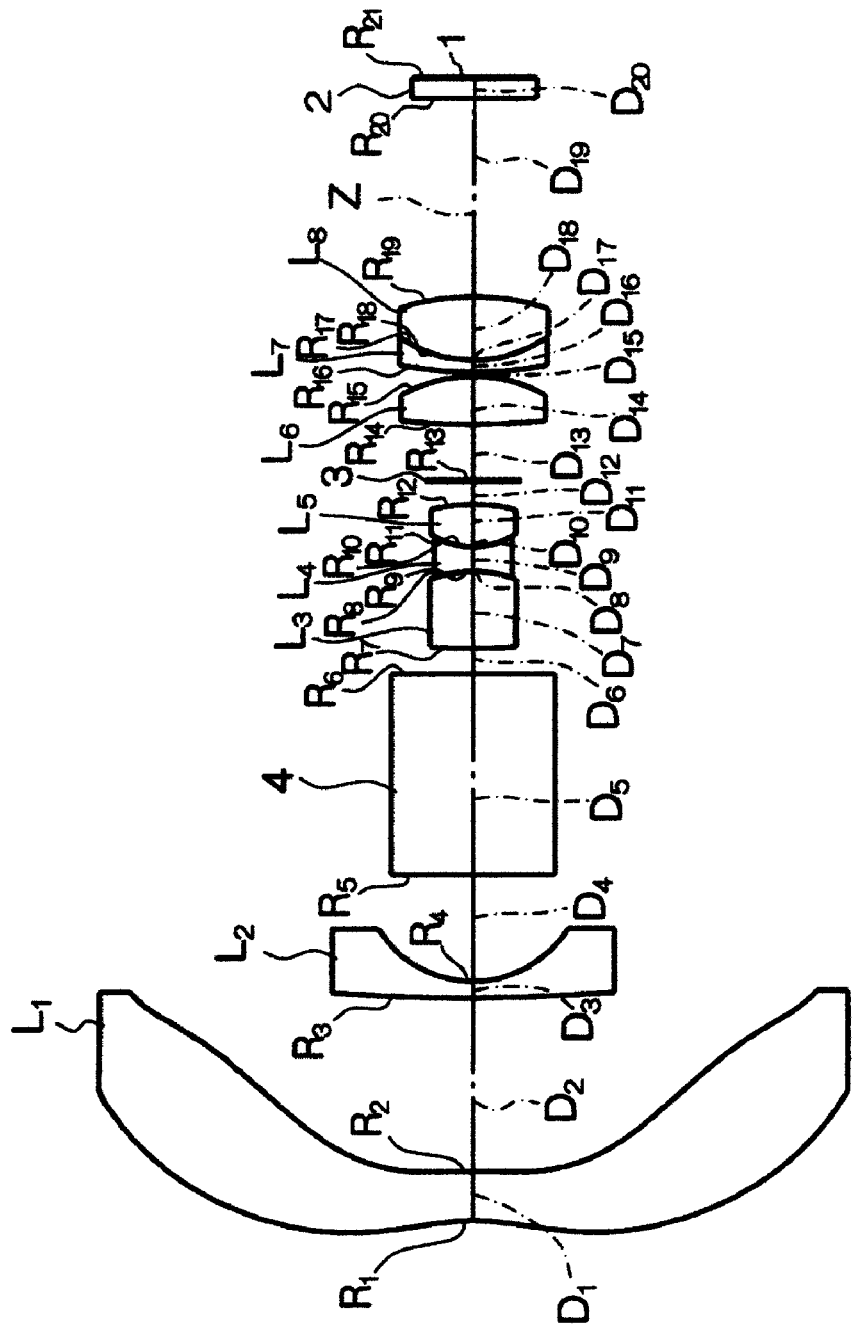
FIG.11 EXAMPLE 6

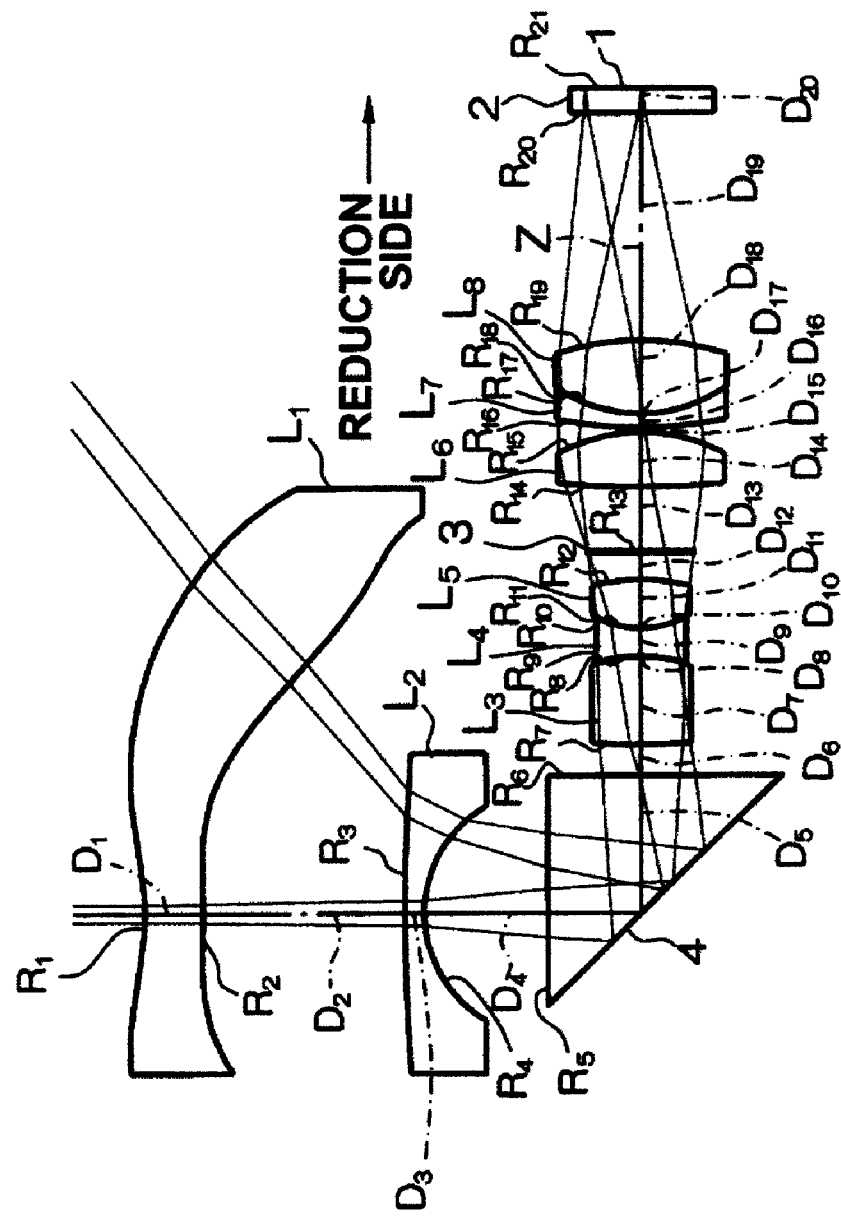
FIG.12 EXAMPLE 6

EXAMPLE 1
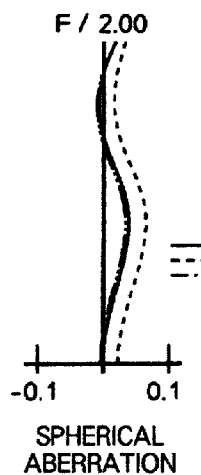
FIG. 13-i
SPHERICAL ABERRATION
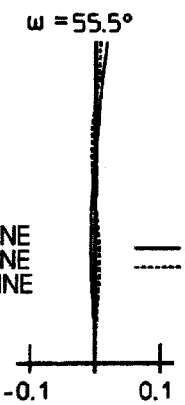
FIG. 13-ii
ASTIGMATISM
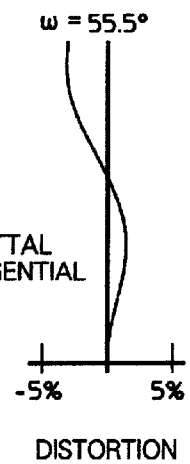
FIG. 13-iii
DISTORTION
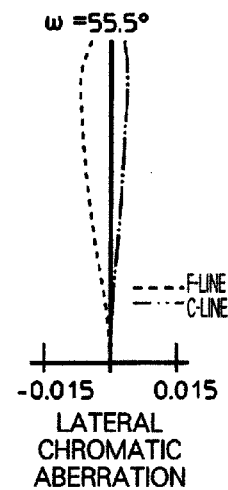
FIG. 13-iv
LATERAL CHROMATIC ABERRATION
EXAMPLE 2
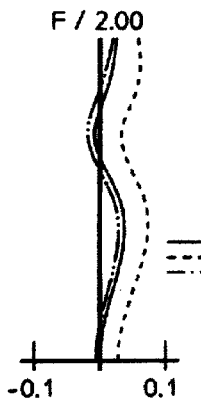
FIG. 14-i
SPHERICAL ABERRATION
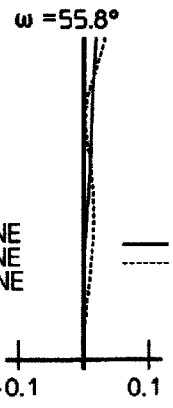
FIG. 14-ii
ASTIGMATISM
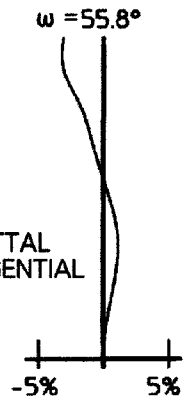
FIG. 14-iii
DISTORTION
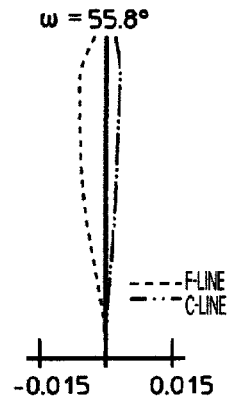
FIG. 14-iv
LATERAL CHROMATIC ABERRATION

EXAMPLE 3

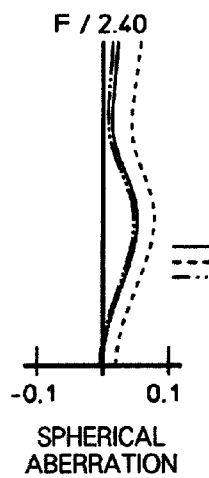

F / 2.40

—— d-LINE
---- F-LINE
-·-·- C-LINE

-0.1  0.1
SPHERICAL
ABERRATION

FIG. 15-i

ω = 55.7°

—— SAGITTAL
------ TANGENTIAL

-0.1  0.1
ASTIGMATISM

FIG. 15-ii

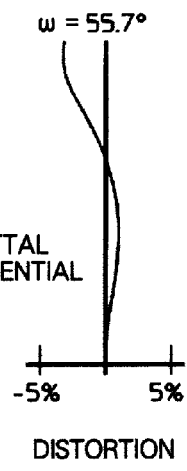

ω = 55.7°

-5%  5%
DISTORTION

FIG. 15-iii

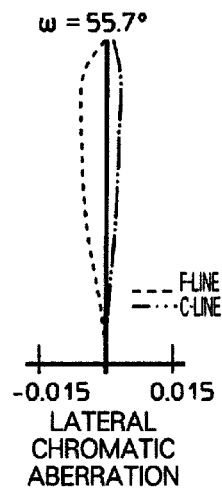

ω = 55.7°

---- F-LINE
-·-·- C-LINE

-0.015  0.015
LATERAL
CHROMATIC
ABERRATION

FIG. 15-iv

EXAMPLE 4

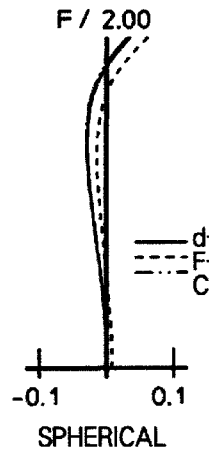

F / 2.00

—— d-LINE
---- F-LINE
-·-·- C-LINE

-0.1  0.1
SPHERICAL
ABERRATION

FIG. 16-i

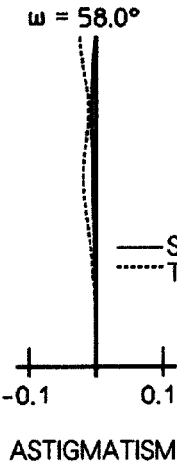

ω = 58.0°

—— SAGITTAL
------ TANGENTIAL

-0.1  0.1
ASTIGMATISM

FIG. 16-ii

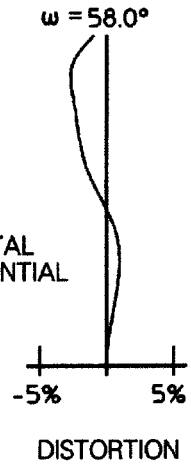

ω = 58.0°

-5%  5%
DISTORTION

FIG. 16-iii

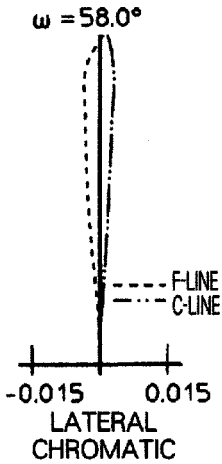

ω = 58.0°

---- F-LINE
-·-·- C-LINE

-0.015  0.015
LATERAL
CHROMATIC
ABERRATION

FIG. 16-iv

EXAMPLE 5
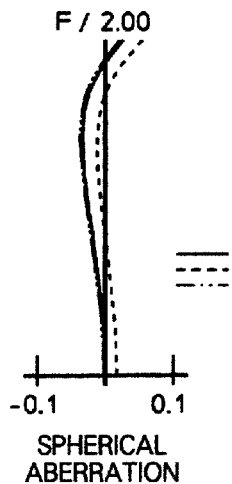
FIG. 17-i
SPHERICAL ABERRATION
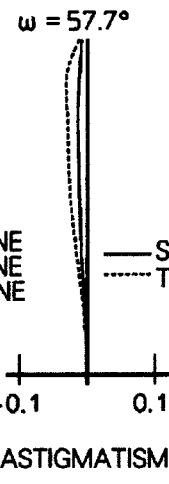
FIG. 17-ii
ASTIGMATISM
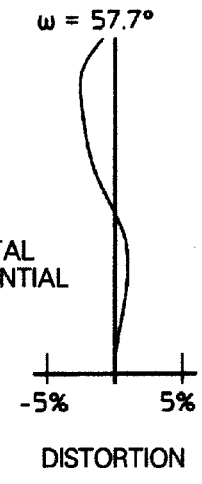
FIG. 17-iii
DISTORTION
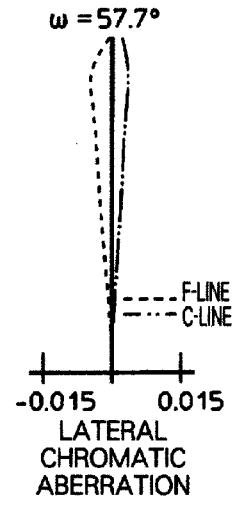
FIG. 17-iv
LATERAL CHROMATIC ABERRATION
EXAMPLE 6
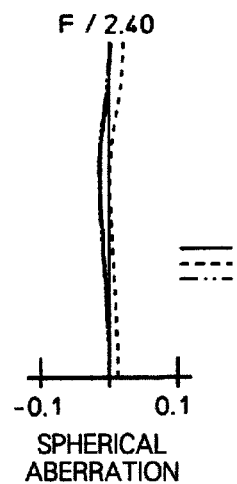
FIG. 18-i
SPHERICAL ABERRATION
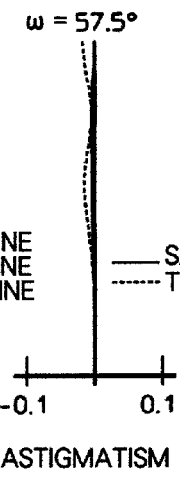
FIG. 18-ii
ASTIGMATISM
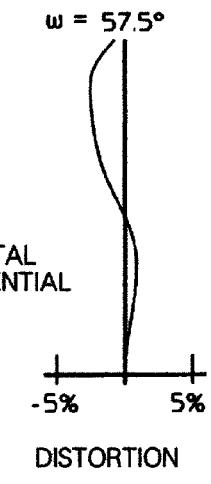
FIG. 18-iii
DISTORTION
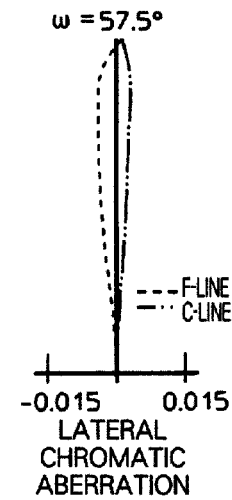
FIG. 18-iv
LATERAL CHROMATIC ABERRATION

PROJECTION LENS AND PROJECTION-TYPE DISPLAY APPARATUS USING THE LENS

BACKGROUND OF THE INVENTION

1. Field of the Invention

The present invention relates to a projection lens for magnifying and projecting display information or the like output from a light valve, such as a liquid crystal display device and a DMD (digital micromirror device). Further, the present invention relates to a projection-type display apparatus using the projection lens.

2. Description of the Related Art

In recent years, projection-type display apparatuses using light valves, such as a transmissive or reflective liquid crystal display device and a DMD display device, became widely used. Especially, projection-type display apparatuses using three light valves corresponding to illumination light of RGB primary colors are widely used. In the projection-type display apparatuses using three light valves, rays of illumination light of RGB primary colors are modulated by respective light valves, and combined by a prism or the like. Further, an image is projected onto a screen through a projection lens.

As described above, a prism or the like for combining colors is arranged in the projection-type display apparatus, in which rays of light modulated by three light valves are combined by a color combination optical system. Therefore, a projection lens mounted on the projection-type display apparatus needs to have a long back focus. The long back focus is necessary also to prevent a thermal problem in the apparatus.

Further, in such a projection lens, projection of a large image with a short projection distance is requested. Further, since reduction in the thickness of an apparatus is strongly requested especially in a rear-type projection apparatus, a wide-angle projection lens is requested.

To satisfy such requests, the inventor of the present invention has disclosed a projection lens that has a wide angle of more than or equal to approximately 105 degrees and excellent projection performance, while maintaining a long back focus (please refer to U.S. Pat. No. 7,529,033 (Patent Document 1)).

However, the number of lenses in the projection lens disclosed in Patent Document 1 is in the range of 13 to 16. Therefore, in Patent Document 1, the size and the cost of the projection lens are not reduced in an excellent manner.

Further, reduction in the diameter of a magnification-side lens in the projection lens is requested to reduce the size of the projection lens.

Especially, when a reflective liquid crystal display device or the like is used, a long back focus is requested. However, in the projection lens disclosed in Patent Document 1, the back focus is not always appropriate.

SUMMARY OF THE INVENTION

In view of the foregoing circumstances, it is an object of the present invention to provide a projection lens that has a wide angle and excellent projection performance while maintaining a long back focus, and the size and the cost of which are reducible. Further, it is another object of the present invention to provide a projection-type display apparatus.

A projection lens according to a first aspect of the present invention (corresponding to Claim 1) is a projection lens comprising:

a first lens having at least an aspheric surface;
a second lens having a concave surface facing the reduction side of the projection lens, and having negative refractive power;
a third lens;
a fourth lens having a convex surface facing the reduction side, and having positive refractive power;
a fifth lens having a concave surface facing the reduction side, and having negative refractive power; and
a sixth lens having a convex surface facing the reduction side, and having positive refractive power, which are sequentially arranged from the magnification side of the projection lens,
wherein the following formulas (1) and (2) are satisfied:

$$3.5 < Bf/f < 7.5 \qquad (1); \text{ and}$$

$$1.2 < |fa/f| < 2.0 \qquad (2), \text{ where}$$

f: focal length of the entire system of the projection lens,
Bf: back focus in air of the entire system, and
fa: combined focal length of lenses from the second lens to a most-reduction-side lens (a lens located on the most reduction side among lenses of the projection lens).

A projection lens according to a second aspect of the present invention (corresponding to Claim 2) is a projection lens comprising:

a first lens having at least an aspheric surface;
a second lens having a concave surface facing the reduction side of the projection lens, and having negative refractive power;
a third lens having positive refractive power;
a fourth lens having negative refractive power;
a fifth lens having positive refractive power;
a sixth lens having a convex surface facing the reduction side, and having positive refractive power;
a seventh lens having a concave surface facing the reduction side, and having negative refractive power; and
an eighth lens having a convex surface facing the reduction side, and having positive refractive power, which are sequentially arranged from the magnification side of the projection lens,
wherein the following formulas (1) and (2) are satisfied:

$$3.5 < Bf/f < 7.5 \qquad (1); \text{ and}$$

$$1.2 < |fa/f| < 2.0 \qquad (2), \text{ where}$$

f: focal length of the entire system of the projection lens,
Bf: back focus in air of the entire system, and
fa: combined focal length of lenses from the second lens to a most-reduction-side lens.

In the projection lens according to the first aspect of the present invention and the projection lens according to the second aspect of the present invention, it is desirable that the following formula (3) is satisfied:

$$3.0 < fb/f < 6.5 \qquad (3), \text{ where}$$

fb: combined focal length of three lenses from the reduction side.

In the projection lens according to the first aspect of the present invention and the projection lens according to the second aspect of the present invention, it is desirable that an air space between the second lens and the third lens is longest among air spaces in the projection lens, and that the following formula (4) is satisfied:

$$5.0 < d/f < 10.0 \qquad (4), \text{ where}$$

d: air space between the reduction-side surface of the second lens and the magnification-side surface of the third lens.

In the projection lens according to the first aspect of the present invention and the projection lens according to the second aspect of the present invention, it is desirable that the following formula (5) is satisfied:

$$\nu_3 < 40 \tag{5}$$

where $\nu_3$: Abbe number of the third lens for d-line.

In the projection lens according to the first aspect of the present invention and the projection lens according to the second aspect of the present invention, it is desirable that at least a surface of the third lens is aspheric.

In the projection lens according to the first aspect of the present invention and the projection lens according to the second aspect of the present invention, it is desirable that the following formula (6) is satisfied:

$$8.0 < |f_1/f| \tag{6}$$

where $f_1$: focal length of the first lens.

In the projection lens according to the first aspect of the present invention and the projection lens according to the second aspect of the present invention, it is desirable that the following formula (7) is satisfied:

$$10.0 < |f_3/f| \tag{7}$$

where $f_3$: focal length of the third lens.

In the projection lens according to the first aspect of the present invention and the projection lens according to the second aspect of the present invention, it is desirable that an air space between the second lens and the third lens is longest among air spaces in the projection lens, and that a light deflection means is inserted into the air space between the second lens and the third lens to deflect light.

In the projection lens according to the first aspect of the present invention and the projection lens according to the second aspect of the present invention, it is desirable that the first lens has a non-circular shape including an effective rays passing area.

Further, a projection-type display apparatus according to the present invention is a projection-type display apparatus comprising:

a light source;

a light valve;

an illumination optical unit that guides rays output from the light source to the light valve; and a projection lens according to the present invention, wherein the rays output from the light source are optically modulated by the light valve and projected onto a screen by the projection lens.

In the projection lens and the projection-type display apparatus according to the present invention, the projection lens is composed of six or eight lenses, and structured as described above. Therefore, the projection lens has a wide angle and an excellent projection performance, while maintaining a long back focus. Further, it is possible to reduce the size and the cost of the projection lens and the projection-type display apparatus.

When the projection lens satisfies the formula (1), it is possible to prevent the size of the lens system from becoming large, while maintaining a necessary back focus for combining colors and for separating illumination light and projection light from each other.

Further, when the formula (2) is satisfied, it is possible to correct aberration of the most-magnification-side lens (a lens located on the most magnification side among lenses of the projection lens) in an excellent manner, while reducing the size of at least one magnification-side lens in the projection lens.

BRIEF DESCRIPTION OF THE DRAWINGS

FIG. 11 is a diagram illustrating the structure of a projection lens in Example 6;

FIG. 12 is a diagram illustrating the structure of a projection lens in which a prism for deflecting light is arranged and the shape of the first lens is changed in the projection lens illustrated in FIG. 11;

FIG. 13-*i* is a diagram illustrating the spherical aberration of the projection lens in Example 1;

FIG. 13-*ii* is a diagram illustrating the astigmatism of the projection lens in Example 1;

FIG. 13-*iii* is a diagram illustrating the distortion of the projection lens in Example 1;

FIG. 13-*iv* is a diagram illustrating the lateral chromatic aberration of the projection lens in Example 1;

FIG. 14-*i* is a diagram illustrating the spherical aberration of the projection lens in Example 2;

FIG. 14-*ii* is a diagram illustrating the astigmatism of the projection lens in Example 2;

FIG. 14-*iii* is a diagram illustrating the distortion of the projection lens in Example 2;

FIG. 14-*iv* is a diagram illustrating the lateral chromatic aberration of the projection lens in Example 2;

FIG. 15-*i* is a diagram illustrating the spherical aberration of the projection lens in Example 3;

FIG. 15-*ii* is a diagram illustrating the astigmatism of the projection lens in Example 3;

FIG. 15-*iii* is a diagram illustrating the distortion of the projection lens in Example 3;

FIG. 15-*iv* is a diagram illustrating the lateral chromatic aberration of the projection lens in Example 3;

FIG. 16-*i* is a diagram illustrating the spherical aberration of the projection lens in Example 4;

FIG. 16-*ii* is a diagram illustrating the astigmatism of the projection lens in Example 4;

FIG. 16-*iii* is a diagram illustrating the distortion of the projection lens in Example 4;

FIG. 16-*iv* is a diagram illustrating the lateral chromatic aberration of the projection lens in Example 4;

FIG. 17-*i* is a diagram illustrating the spherical aberration of the projection lens in Example 5;

FIG. 17-*ii* is a diagram illustrating the astigmatism of the projection lens in Example 5;

FIG. 17-*iii* is a diagram illustrating the distortion of the projection lens in Example 5;

FIG. 17-*iv* is a diagram illustrating the lateral chromatic aberration of the projection lens in Example 5;

FIG. 18-*i* is a diagram illustrating the spherical aberration of the projection lens in Example 6;

FIG. 18-*ii* is a diagram illustrating the astigmatism of the projection lens in Example 6;

FIG. 18-*iii* is a diagram illustrating the distortion of the projection lens in Example 6;

FIG. 18-*iv* is a diagram illustrating the lateral chromatic aberration of the projection lens in Example 6;

DESCRIPTION OF THE PREFERRED EMBODIMENTS

Figure 1:
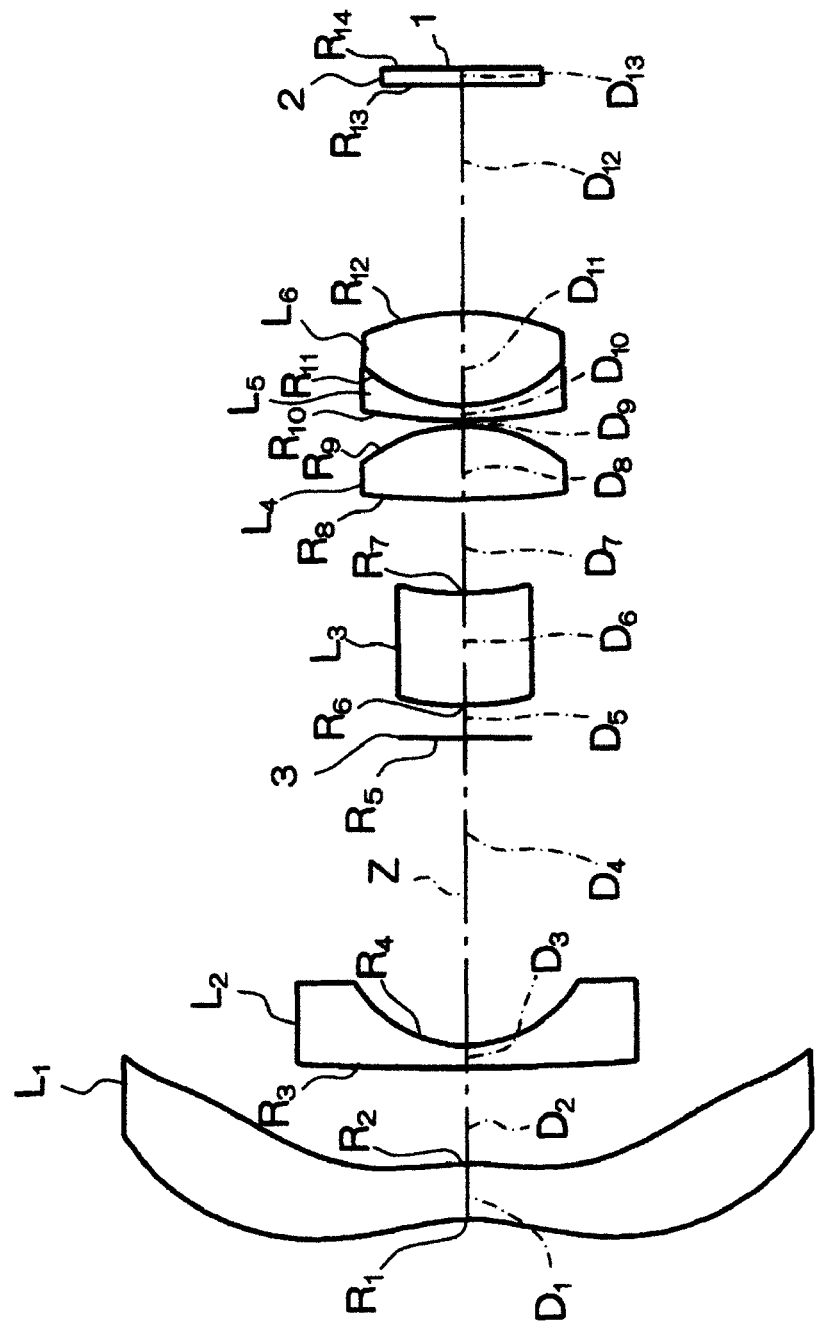
FIG. 1 is a diagram illustrating the structure of a projection lens in Example 1 of the present invention.
Figure 2:
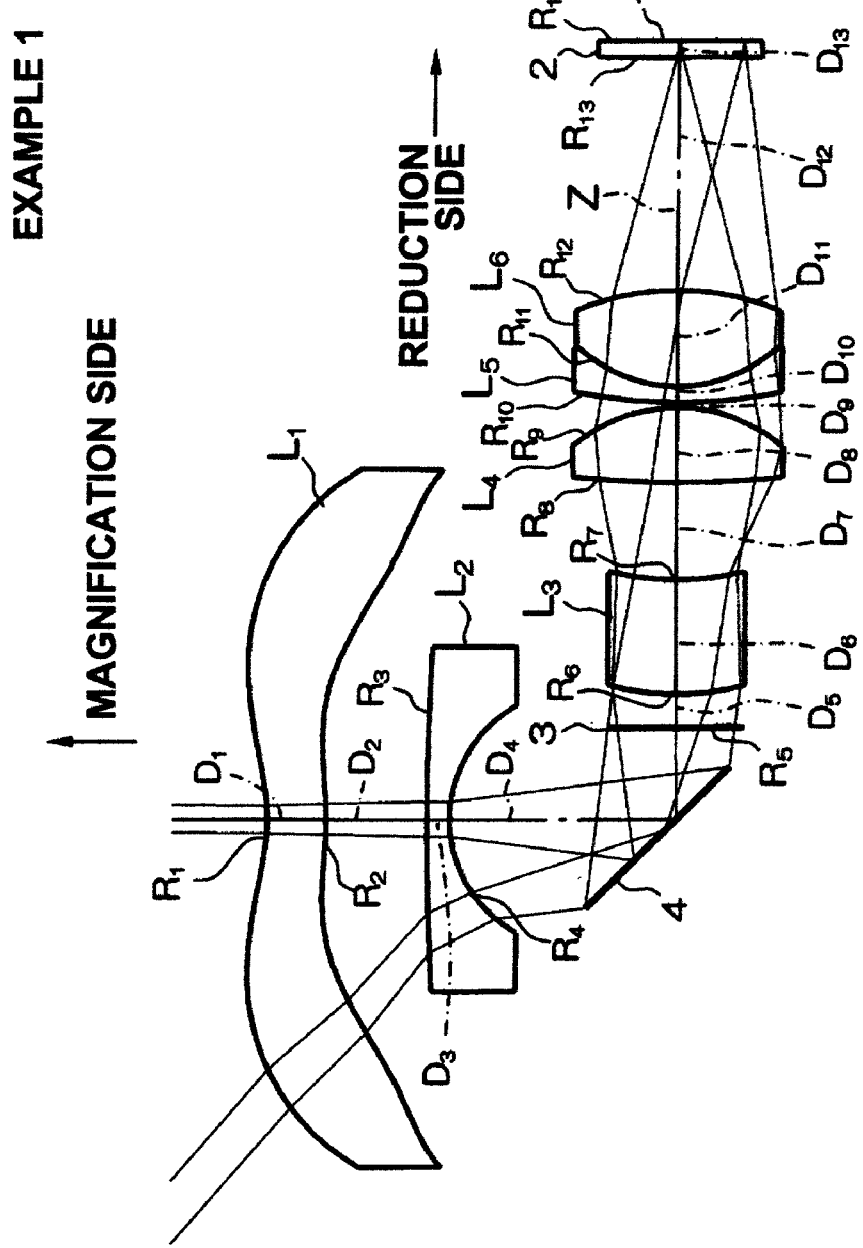
FIG. 2 is a diagram illustrating the structure of a projection lens in which a mirror for deflecting light is arranged in the projection lens illustrated in FIG. 1.

Hereinafter, embodiments of the present invention will be described with reference to drawings. FIG. 1 is a diagram illustrating the structure of a projection lens in Example 1, which will be described later. The first embodiment of the present invention will be described, using the projection lens illustrated in FIG. 1 as an example. FIG. 2 is a diagram illustrating a modification example of the projection lens of Example 1. In the descriptions of the first embodiment, FIG. 2 will also be described.

Figure 7:
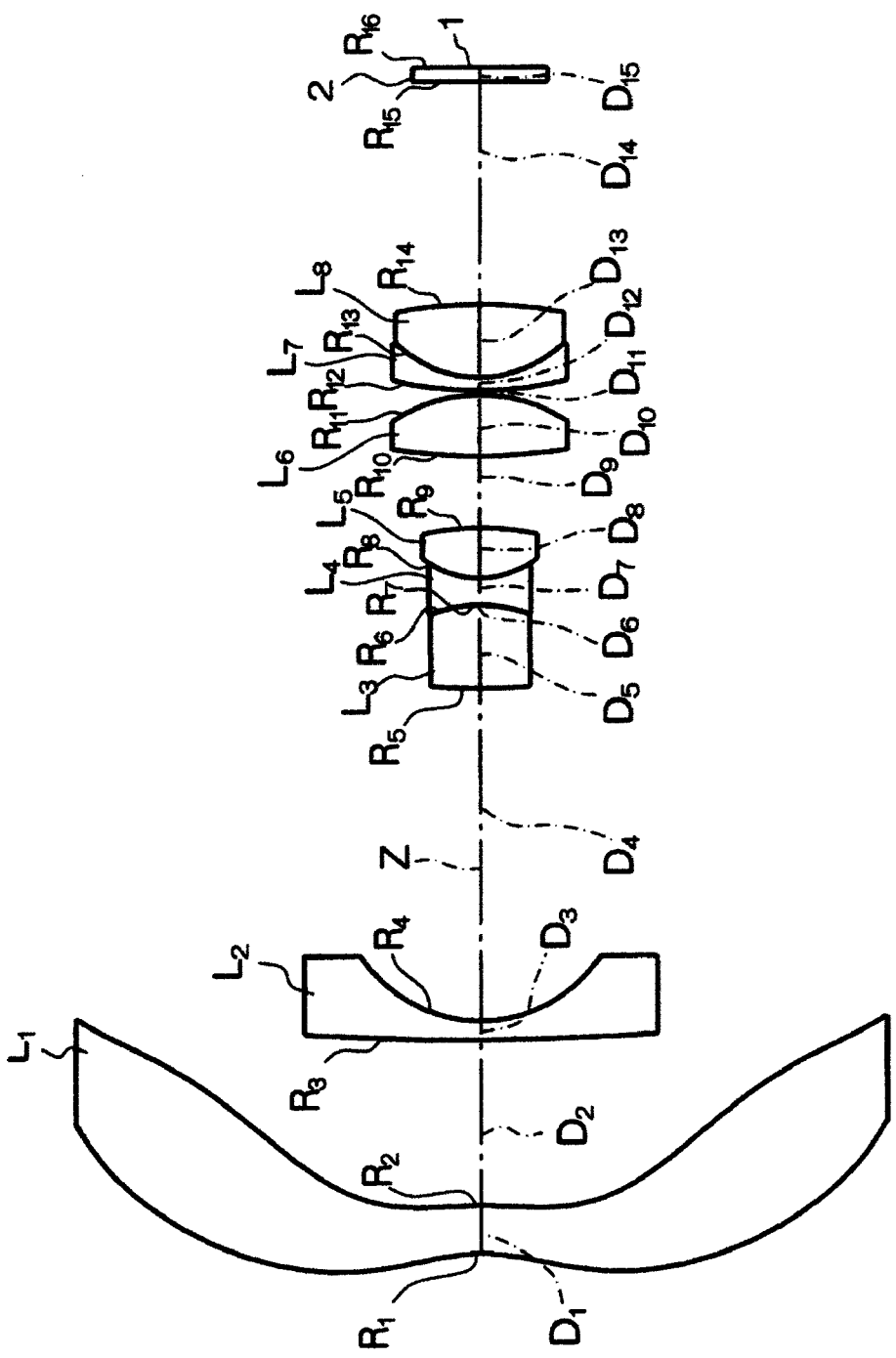
FIG. 7 is a diagram illustrating the structure of a projection lens in Example 4.
Figure 8:
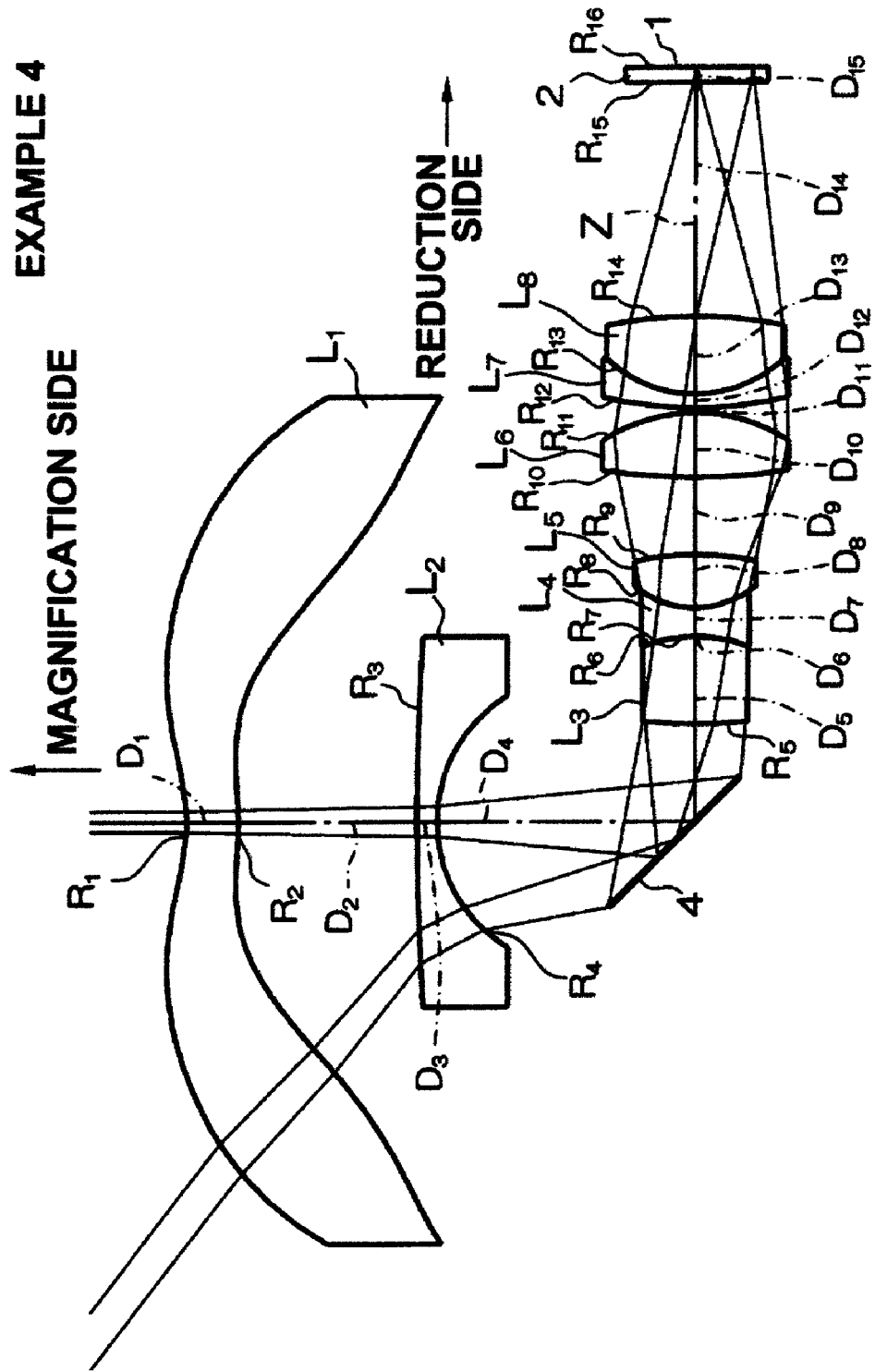
FIG. 8 is a diagram illustrating the structure of a projection lens in which a mirror for deflecting light is arranged in the projection lens illustrated in FIG. 7.

Further, FIG. 7 is a diagram illustrating the structure of a projection lens in Example 4, which will be described later. The second embodiment of the present invention will be described, using the projection lens illustrated in FIG. 7 as an example. FIG. 8 is a diagram illustrating a modification example of the projection lens of Example 4. In the descriptions of the second embodiment, FIG. 8 will also be described.

In the drawings, line Z represents an optical axis.

<First Embodiment>

A projection lens according to the first embodiment of the present invention is designed to achieve excellent projection performance, while reducing the size of the projection lens (compact projection lens).

As illustrated in FIG. 1, the projection lens according to the first embodiment includes first lens $L_1$ having at least an aspheric surface, second lens $L_2$ having a concave surface facing the reduction side of the projection lens, and having negative refractive power, third lens $L_3$, fourth lens $L_4$ having a convex surface facing the reduction side, and having positive refractive power, fifth lens $L_5$ having a concave surface facing the reduction side, and having negative refractive power, and sixth lens $L_6$ having a convex surface facing the reduction side, and having positive refractive power, which are sequentially arranged from the magnification side of the projection lens. Further, the reduction side of the projection lens is telecentric. Further, a stop (a mask may be provided instead of the stop) 3 may be arranged at a certain position in the lens system (in Example 1, a stop is arranged between the second lens $L_2$ and the third lens $L_3$).

As described above, both surfaces of the first lens $L_1$ may be aspheric. Further, the first lens $L_1$ is formed in such a manner that the refractive power linearly increases, in a positive direction, from the center of the lens toward the periphery of the lens (When the refractive power of the lens on optical axis Z is positive, the lens is formed in such a manner that the positive refractive power increases toward the periphery of the lens. When the refractive power of the lens on optical axis Z is negative, the lens is formed in such a manner that first, the negative refractive power becomes weaker toward the periphery of the lens to reach zero, and after reaching zero, positive refractive power increases toward the periphery of the lens).

Further, it is desirable that the fifth lens $L_5$ and the sixth lens $L_6$ are cemented together to form a cemented lens (Examples 1 and 2, which will be described later), or arranged close to each other (Example 3, which will be described later).

In FIG. 1, rays of light enter an image display plane 1 of a light valve from the right side of the paper, and image information is given to the rays of light at the image display plane 1. Further, the rays of light pass through a filter 2 (various kinds of filter), and enter the projection lens. The rays of light are magnified and projected toward the left side of the paper by the projection lens. In FIG. 1, only one image display plane 1 is illustrated so that the structure is easily recognizable. Alternatively, a projection-type display apparatus may display a full color image by separating rays of light output from a light source into rays of light of three primary colors by a color separation optical system, and by providing three light valves for the rays of light of three primary colors, respectively. When a color combination optical system, such as a cross dichroic prism, is arranged between the image display plane 1 and the sixth lens $L_6$ (when the light valve is a reflective liquid crystal display panel, a polarization plate or a ¼ wavelength plate is used in addition to the light valve), the rays of light of three primary colors can be combined together.

Further, it is desirable that an air space between the second lens $L_2$ and the third lens $L_3$ is longest among air spaces in the projection lens. Further, it is desirable that a light deflection means 4 is inserted into the air space between the second lens $L_2$ and the third lens $L_3$ to deflect the optical path of the projection lens. In the modified example illustrated in FIG. 2, a light reflection mirror, as the light deflection means 4, is arranged between the second lens $L_2$ and the third lens $L_3$ in the projection lens illustrated in FIG. 1 to deflect rays of light only by 90 degrees (in the modification example of Example 2, a light reflection mirror is arranged, and in Example 3 and the modification example of Example 3, a light reflection prism is arranged). Therefore, it is possible to reduce the size of the optical system appropriately based on the size of a space for storing the optical system. When the light deflection means 4 is a light reflection prism, it is possible to reduce the length of the entire system, compared with the case of using a light reflection mirror.

Figure 4:
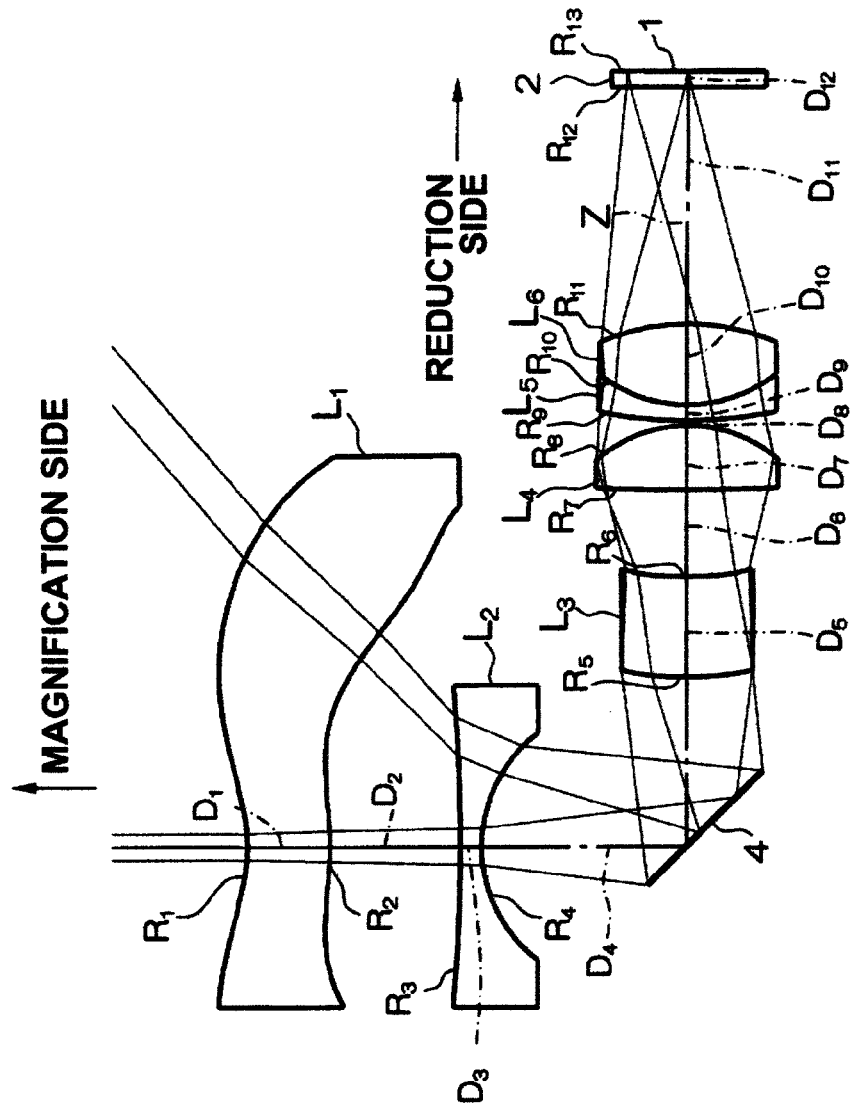
FIG. 4 is a diagram illustrating the structure of a projection lens in which a mirror for deflecting light is arranged in the projection lens illustrated in FIG. 3.
Figure 6:
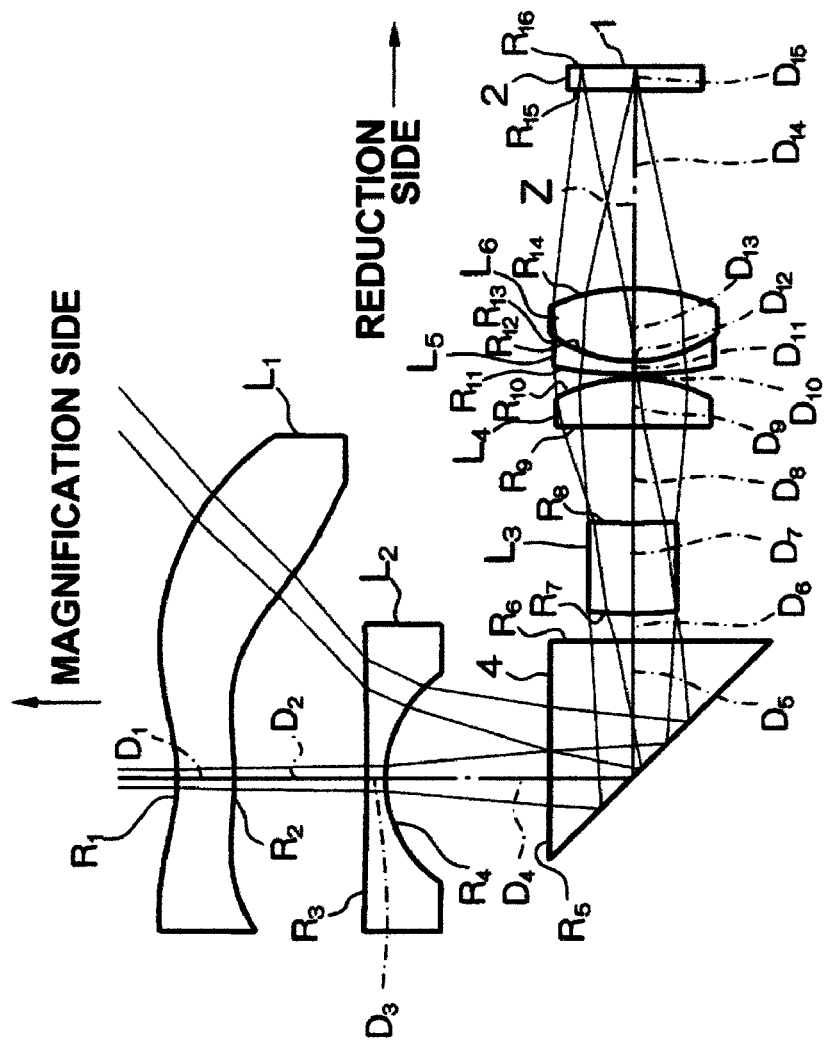
FIG. 6 is a diagram illustrating the structure of a projection lens in which the shape of the first lens is changed in the projection lens illustrated in FIG. 5.

In the modification examples of Examples 2 and 3, which will be described later, the first lens $L_1$ has a non-circular shape including an effective rays passing area, as illustrated in FIGS. 4 and 6. In other words, a part of the first lens $L_1$ is cut, and the first lens $L_1$ is not rotary symmetric.

The first lens $L_1$ is formed in such a manner to prevent the diameter of the first lens $L_1$ from becoming too large. In the present embodiment, the first lens $L_1$ has a non-circular shape including an effective rays passing area, and an unnecessary lens portion is not formed in the first lens $L_1$ (by performing so-called D-cut). Therefore, the size of the first lens $L_1$ is reduced, and the size of the entire lens system is reduced.

In the projection lens of the present embodiment, it is desirable that at least a surface of at least the third lens $L_3$ is aspheric in addition to at least a surface of the first lens $L_1$.

Consequently, it is possible to improve the projection performance of the projection lens, while reducing the number of lenses in the projection lens.

In the projection lens of the present embodiment, it is desirable that both of the following formulas (1) and (2) are satisfied:

$$3.5 < Bf/f < 7.5 \qquad (1); \text{ and}$$

$$1.2 < |fa/f| < 2.0 \qquad (2), \text{ where}$$

f: focal length of the entire system of the projection lens,
Bf: back focus in air of the entire system, and
fa: combined focal length of lenses from the second lens to a most-reduction-side lens (sixth lens $L_6$).

The projection lens structured as described above has a wide angle and excellent projection performance, while maintaining a long back focus.

When the formula (1) is satisfied, it is possible to prevent the size of the lens system from becoming large, while maintaining a back focus necessary for color combination processing and light separation processing, which separates illumination light and projection light from each other. Specifically, when the value of Bf/f is lower than the lower limit defined by the formula (1), it becomes difficult to maintain a necessary back focus for color combination processing and light separation processing of illumination light and projection light. When the value of Bf/f exceeds the upper limit defined by the formula (1), the size of the lens system becomes large. When a back focus in a range satisfying the formula (1) is maintained, it is possible to adopt a light valve of a reflective liquid crystal type (LCOS (liquid crystal on silicon) type) in an excellent manner. The light valve of the reflective liquid crystal type requires insertion of a color separation/combination prism, a polarization plate, a ¼ wavelength plate, or the like into the system.

Therefore, it is desirable that the following formula (1') is satisfied instead of the formula (1). Further, it is more desirable that the following formula (1") is satisfied instead of the formula (1):

$$4.0 < Bf/f < 6.0 \qquad (1'); \text{ and}$$

$$4.0 < Bf/f < 5.0 \qquad (1'').$$

Further, when the formula (2) is satisfied, it is possible to correct aberration of the most-magnification-side lens in an excellent manner, while reducing the size of at least one magnification-side lens. Specifically, when the value of |fa/f| is lower than the lower limit defined by the formula (2), the size of at least one magnification-side lens becomes large. When the value of |fa/f| exceeds the upper limit defined by the formula (2), it becomes difficult to correct aberration of the most-magnification-side lens in an excellent manner.

Therefore, it is desirable that the following formula (2') is satisfied instead of the formula (2). Further, it is more desirable that the following formula (2") is satisfied instead of the formula (2):

$$1.3 < |fa/f| < 1.8 \qquad (2'); \text{ and}$$

$$1.4 < |fa/f| < 1.7 \qquad (2'').$$

In the projection lens according to the present embodiment, it is desirable that at least one of the following formulas (3) through (7) is satisfied in addition to the formulas (1) and (2):

$$3.0 < fb/f < 6.5 \qquad (3);$$

$$5.0 < d/f < 10.0 \qquad (4);$$

$$v_3 < 40 \qquad (5);$$

$$8.0 < |f_1/f| \qquad (6); \text{ and}$$

$$10.0 < |f_3/f| \qquad (7), \text{ where}$$

fb: combined focal length of three lenses from the reduction side (lenses $L_4$, $L_5$, $L_6$),
d: air space between the reduction-side surface of the second lens $L_2$ and the magnification-side surface of the third lens $L_3$,
$v_3$: Abbe number of the third lens $L_3$ for d-line,
$f_1$: focal length of the first lens $L_1$, and
$f_3$: focal length of the third lens $L_3$.

The formula (4) is based on the premise that an air space between the second lens $L_2$ and the third lens $L_3$ is longest among air spaces in the projection lens.

Next, the meanings of the formulas (3) through (7) will be described.

When the formula (3) is satisfied, it is possible to prevent the refractive power from becoming too large and to correct various kinds of aberration in an excellent manner. Further, it is possible to prevent aback focus from becoming too long, and to correct lateral chromatic aberration in an excellent manner. Specifically, when the value of fb/f is lower than the lower limit defined by the formula (3), the refractive power is too strong, and it becomes difficult to correct aberration. When the value of fb/f exceeds the upper limit defined by the formula (3), aback focus becomes too long, and lateral chromatic aberration is insufficiently corrected.

Therefore, it is desirable that the following formula (3') is satisfied instead of the' formula (3). Further, it is more desirable that the following formula (3") is satisfied instead of the formula (3):

$$4.0 < fb/f < 6.0 \qquad (3'); \text{ and}$$

$$4.0 < fb/f < 4.6 \qquad (3'').$$

Further, when the formula (4) is satisfied, it is possible to set an appropriate back focus to arrange a light deflection means between lenses, and to prevent the size of the lens system from becoming large. Specifically, when the value of d/f is lower than the lower limit defined by the formula (4), a back focus becomes too short, and it becomes difficult to arrange the light deflection means 4 between lenses. When the value of d/f exceeds the upper limit defined by the formula (4), the size of the lens system becomes large.

Therefore, it is desirable that the following formula (4') is satisfied instead of the formula (4). Further, it is more desirable that the following formula (4") is satisfied instead of the formula (4):

$$5.5 < d/f < 9.0 \qquad (4'); \text{ and}$$

$$6.0 < d/f < 8.5 \qquad (4'').$$

When the formula (5) is satisfied, it is possible to correct longitudinal chromatic aberration in an excellent manner. Specifically, when the value of $v_3$ is lower than the lower limit defined by the formula (5), it becomes difficult to correct longitudinal chromatic aberration in an excellent manner.

Therefore, it is desirable that the following formula (5') is satisfied instead of the formula (5):

$$v_3 < 30 \qquad (5').$$

Further, when at least one of the formulas (6) and (7) is satisfied, it is possible to suppress deterioration in performance caused by a change in temperature. Specifically, when the value of $|f_1/f|$ is lower than the lower limit defined by the formula (6), and the value of $|f_3/f|$ is lower than the lower limit defined by the formula (7), deterioration in performance by a change in temperature becomes intolerable.

Therefore, it is desirable that the following formulas (6') and (7') are satisfied instead of the formulas (6) and (7). Further, it is more desirable that the following formula (6") is satisfied instead of the formula (6):

$$8.0 < |f_1/f| < 20.0 \tag{6'};$$

$$10.0 < |f_1/f| < 16.0 \tag{6''}; \text{ and}$$

$$20.0 < |f_3/f| < 30.0 \tag{7'}.$$

<Second Embodiment>

A projection lens according to the second embodiment is designed in such a manner to have excellent projection performance, while reducing the size of the projection lens.

Specifically, as illustrated in FIG. 7, the projection lens according to the second embodiment includes first lens $L_1$ having at least an aspheric surface, second lens $L_2$ having a concave surface facing the reduction side of the projection lens, and having negative refractive power, third lens $L_3$ having positive refractive power, fourth lens $L_4$ having negative refractive power, fifth lens $L_5$ having positive refractive power, sixth lens $L_6$ having a convex surface facing the reduction side, and having positive refractive power, seventh lens $L_7$ having a concave surface facing the reduction side, and having negative refractive power, and eighth lens $L_8$ having a convex surface facing the reduction side, and having positive refractive power, which are sequentially arranged from the magnification side of the projection lens. Further, the reduction side of the projection lens is substantially telecentric. Further, a stop (a mask may be provided instead of the stop) 3 may be arranged at a certain position in the lens system (in Example 5, a stop is arranged between the second lens $L_2$ and the third lens $L_3$, and in Example 6, a stop is arranged between the fifth lens $L_5$ and the sixth lens $L_6$).

As described above, both surfaces of the first lens $L_1$ may be aspheric. Further, the first lens $L_1$ is formed in such a manner that the refractive power linearly increases, in a positive direction, from the center of the lens toward the periphery of the lens (When the refractive power of the lens on optical axis Z is positive, the lens is formed in such a manner that the positive refractive power increases toward the periphery of the lens. When the refractive power of the lens on optical axis Z is negative, the lens is formed in such a manner that first, the negative refractive power becomes weaker toward the periphery of the lens to reach zero, and after reaching zero, positive refractive power increases toward the periphery of the lens).

Further, it is desirable that the fourth lens $L_4$ and the fifth lens $L_5$ are cemented together to form a cemented lens, and the seventh lens $L_7$ and the eighth lens $L_8$ are cemented together to form a cemented lens (Examples 4 and 5, which will be described later), or the fourth lens $L_4$ and the fifth lens $L_5$ are arranged close to each other, and the seventh lens $L_7$ and the eighth lens $L_8$ are arranged close to each other (Example 6, which will be described later).

In FIG. 7, rays of light enter an image display plane 1 of a light valve from the right side of the paper, and image information is given to the rays of light at the image display plane 1. Further, the rays of light pass through a filter 2 (various kinds of filter), and enter the projection lens. Further, the rays of light are magnified and projected toward the left side of the paper by the projection lens. In FIG. 7, only one image display plane 1 is illustrated so that the structure is easily recognizable. Alternatively, a projection-type display apparatus may display a full color image by separating rays of light output from a light source into rays of light of three primary colors by a color separation optical system, and by providing three light valves for the rays of light of three primary colors, respectively.

When a color combination optical system, such as a cross dichroic prism, is arranged between the image display plane 1 and the eighth lens $L_8$ (when the light valve is a reflective liquid crystal display panel, a polarization plate or a ¼ wavelength plate is used in addition to the light valve), the rays of light of three primary colors can be combined together.

Further, it is desirable that an air space between the second lens $L_2$ and the third lens $L_3$ is longest among air spaces in the projection lens. Further, it is desirable that a light deflection means 4 is inserted into the air space between the second lens $L_2$ and the third lens $L_3$ to deflect the optical path of the projection lens. In the modified example illustrated in FIG. 8, a light reflection mirror, as the light deflection means 4, is arranged between the second lens $L_2$ and the third lens $L_3$ in the projection lens illustrated in FIG. 7 to deflect light only by 90 degrees (in the modification examples of Examples 4 and 5, a light reflection mirror is arranged, and in Example 6 and the modification example of Example 6, a light reflection prism is arranged). Therefore, it is possible to reduce the size of the optical system appropriately based on the size of a space for storing the optical system. When the light deflection means 4 is a light reflection prism, it is possible to reduce the entire length, compared with the case of using a light reflection mirror.

Figure 10:
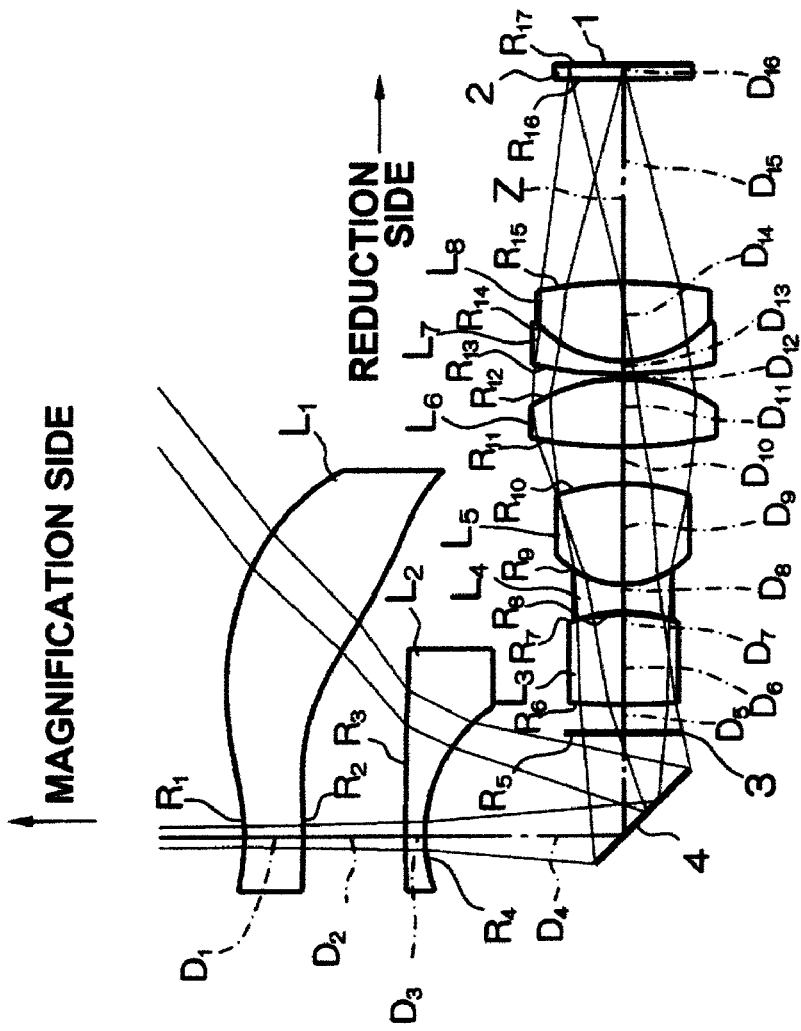
FIG. 10 is a diagram illustrating the structure of a projection lens in which a mirror for deflecting light is arranged and the shape of the first lens and the shape of the second lens are changed in the projection lens illustrated in FIG. 9.

In the modification examples of Example 5, which will be described later, each of the first lens $L_1$ and the second lens $L_2$ has a non-circular shape including an effective rays passing area, as illustrated in FIG. 10. In other words, a part of the first lens $L_1$ and a part of the second lens $L_2$ are cut, and the first lens $L_1$ and the second lens $L_2$ are not rotary symmetric. Further, in the modified example of Example 6, the first lens $L_1$ has a non-circular shape including an effective rays passing area, as illustrated in FIG. 12. In other words, a part of the first lens $L_1$ is cut, and the first lens $L_1$ is not rotary symmetric.

The first lens $L_1$ (and the second lens $L_2$) is formed as described above to prevent the diameter of the first lens $L_1$ (and the second lens $L_2$) from becoming too large. In the present embodiment, the first lens $L_1$ (and the second lens $L_2$) has a non-circular shape including an effective rays passing area, and an unnecessary lens portion is not formed (by performing so-called D-cut). Therefore, the size of the first lens $L_1$ (and the second lens $L_2$) is reduced, and the size of the entire lens system is reduced.

In the projection lens of the present embodiment, it is desirable that at least a surface of the first lens $L_1$ is aspheric. Consequently, it is possible to improve the projection performance of the projection lens, while reducing the number of lenses in the projection lens.

In the projection lens of the present embodiment, it is desirable that both of the following formulas (1) and (2) are satisfied:

$$3.5 < Bf/f < 7.5 \tag{1}; \text{ and}$$

$$1.2 < |fa/f| < 2.0 \tag{2}, \text{ where}$$

f: focal length of the entire system of the projection lens,
Bf: back focus in air of the entire system, and
fa: combined focal length of lenses from the second lens to a most-reduction-side lens (eighth lens $L_8$).

When the projection lens is structured as described above, the projection lens has a wide angle and excellent projection performance, while maintaining a long back focus.

When the formula (1) is satisfied, it is possible to prevent the size of the lens system from becoming large, while maintaining a back focus necessary for color combination processing and light separation processing, in which illumination light and projection light are separated from each other. Specifically, when the value of Bf/f is lower than the lower limit defined by the formula (1), it becomes difficult to maintain a necessary back focus for color combination processing and light separation processing of illumination light and projection light. When the value of Bf/f exceeds the upper limit defined by the formula (1), the size of the lens system becomes large. When a back focus in a range satisfying the formula (1) is maintained, it is possible to adopt a light valve of a reflective liquid crystal type (LCOS (liquid crystal on silicon) type) in an excellent manner. The light valve of the reflective liquid crystal type requires insertion of a color separation/combination prism, a polarization plate, a ¼ wavelength plate, or the like into the system.

Therefore, it is desirable that the following formula (1') is satisfied instead of the formula (1). Further, it is more desirable that the following formula (1''') is satisfied instead of the formula (1):

$$4.0 < Bf/f < 6.0 \quad (1'); \text{ and}$$

$$4.0 < Bf/f < 5.0 \quad (1''').$$

Further, when the formula (2) is satisfied, it is possible to correct aberration of the most-magnification-side lens in an excellent manner, while reducing the size of at least one magnification-side lens. Specifically, when the value of |fa/f| is lower than the lower limit defined by the formula (2), the size of at least one magnification-side lens becomes large. When the value of |fa/f| exceeds the upper limit defined by the formula (2), it becomes difficult to correct aberration of the most-magnification-side lens in an excellent manner.

Therefore, it is desirable that the following formula (2') is satisfied instead of the formula (2). Further, it is more desirable that the following formula (2'') is satisfied instead of the formula (2)

$$1.3 < |fa/f| < 1.8 \quad (2'); \text{ and}$$

$$1.4 < |fa/f| < 1.7 \quad (2'').$$

In the projection lens according to the present embodiment, it is desirable that at least one of the following formulas (3), (4) and (6) is satisfied in addition to the formulas (1) and (2):

$$3.0 < fb/f < 6.5 \quad (3);$$

$$5.0 < d/f < 10.0 \quad (4); \text{ and}$$

$$8.0 < |f_1/f| \quad (6), \text{ where}$$

fb: combined focal length of three lenses from the reduction side (lenses $L_6$, $L_7$, $L_8$), d: air space between the reduction-side surface of the second lens $L_2$ and the magnification-side surface of the third lens $L_3$, and $f_1$: focal length of the first lens $L_1$.

The formula (4) is based on the premise that an air space between the second lens $L_2$ and the third lens $L_3$ is longest among air spaces in the projection lens.

Next, the meanings of the formulas (3), (4) and (6) will be described.

When the formula (3) is satisfied, it is possible to prevent the refractive power from becoming too large and to correct various kinds of aberration in an excellent manner. Further, it is possible to prevent aback focus from becoming too long, and to correct lateral chromatic aberration in an excellent manner. Specifically, when the value of fb/f is lower than the lower limit defined by the formula (3), the refractive power is too strong, and it becomes difficult to correct aberration. When the value of fb/f exceeds the upper limit defined by the formula (3), a back focus becomes too long, and lateral chromatic aberration is insufficiently corrected.

Therefore, it is desirable that the following formula (3') is satisfied instead of the formula (3). Further, it is more desirable that the following formula (3''') is satisfied instead of the formula (3):

$$4.0 < fb/f < 6.0 \quad (3'); \text{ and}$$

$$4.6 < fb/f < 4.6 \quad (3''')$$

Further, when the formula (4) is satisfied, it is possible to set an appropriate back focus to arrange a light deflection means between lenses, and to prevent the size of the lens system from becoming large. Specifically, when the value of d/f is lower than the lower limit defined by the formula (4), a back focus becomes too short, and it becomes difficult to arrange the light deflection means 4 between lenses. When the value of d/f exceeds the upper limit defined by the formula (4), the size of the lens system becomes large.

Therefore, it is desirable that the following formula (4') is satisfied instead of the formula (4). Further, it is more desirable that the following formula (4'') is satisfied instead of the formula (4):

$$5.5 < d/f < 9.0 \quad (4'); \text{ and}$$

$$6.0 < d/f < 8.5 \quad (4'').$$

When the formula (6) is satisfied, it is possible to suppress deterioration in performance caused by a change in temperature. Specifically, when the value of $|f_1/f|$ is lower than the lower limit defined by the formula (6), deterioration in performance caused by a change in temperature becomes intolerable.

Therefore, it is desirable that the following formula (6') is satisfied instead of the formula (6). Further, it is more desirable that the following formula (6'') is satisfied instead of the formula (6):

$$8.0 < |f_1/f| < 20.0 \quad (6'); \text{ and}$$

$$10.0 < |f_1/f| < 16.0 \quad (6'').$$

Next, a projection-type display device according to an embodiment of the present invention will be described.

Figure 19:
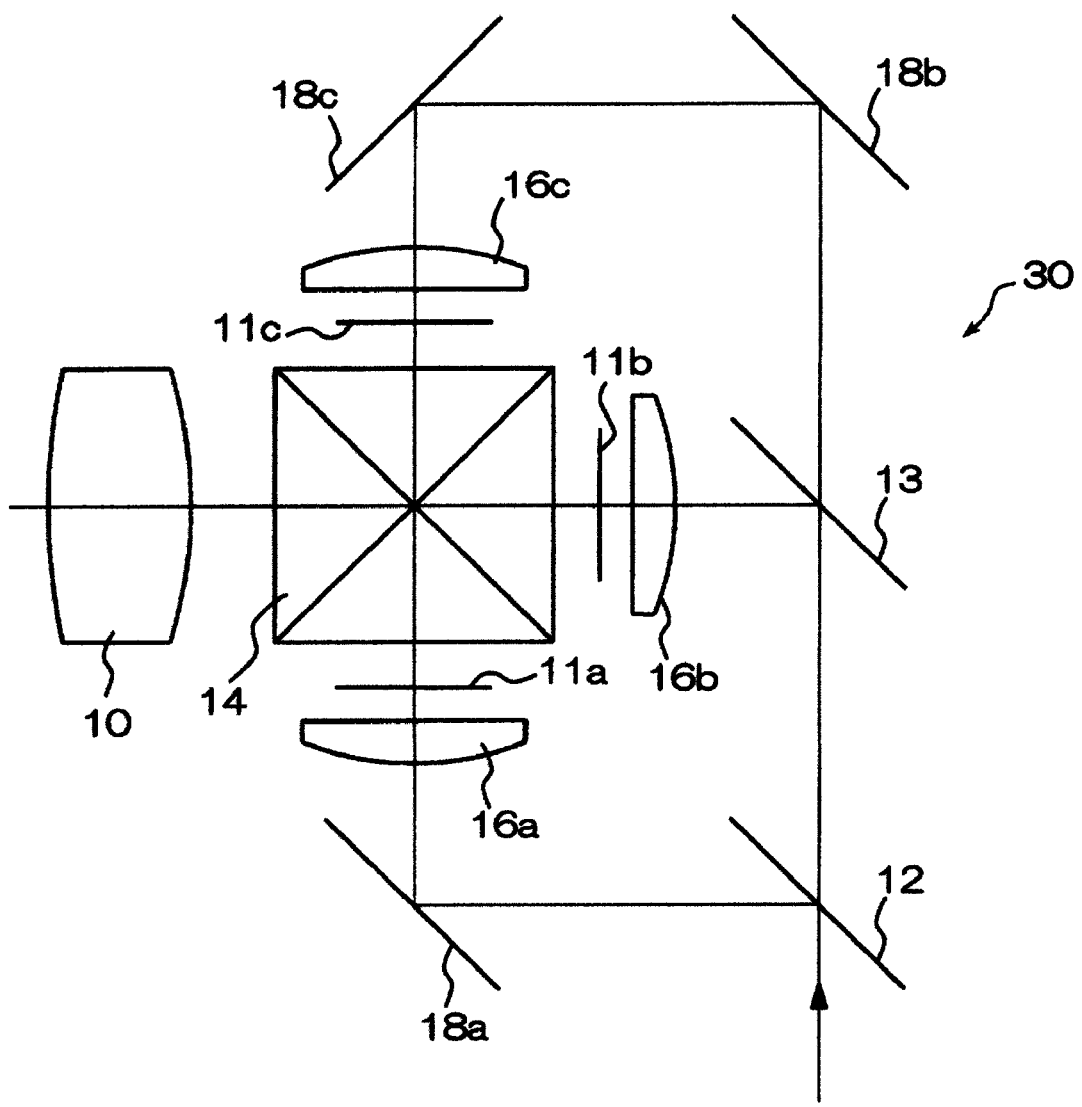
FIG. 19 is a diagram illustrating the structure of an illumination optical system of a projection-type display apparatus (three panel type)

FIG. 19 is a diagram illustrating the structure of an illumination optical system 30 and a projection lens 10, which are a main part of a projection-type display apparatus of three panel type.

As illustrated in FIG. 19, the illumination optical system 30 includes a light source 15, transmissive liquid crystal panels 11a through 11c, as light valves, dichroic mirrors 12, 13 for separating colors, a cross dichroic prism 14 for combining colors, condenser lenses 16a through 16c, and total reflection mirrors 18a through 18c. The light source 15 is arranged before the dichroic mirror 12. White light output from the light source 15 enters, through an illumination optical system, liquid crystal panels 11a through 11c corresponding to rays of light of three colors (G light, B light and R light), respectively, and is modulated. Further, the modulated light is projected onto a screen, which is not illustrated, by the projection lens 10.

The projection-type display apparatus of three panel type uses the projection lens of the present invention. Therefore, it is possible to reduce the size and the cost of the projection-type display apparatus, while maintaining a long back focus and achieving a wide angle and excellent projection performance.

Figure 20:
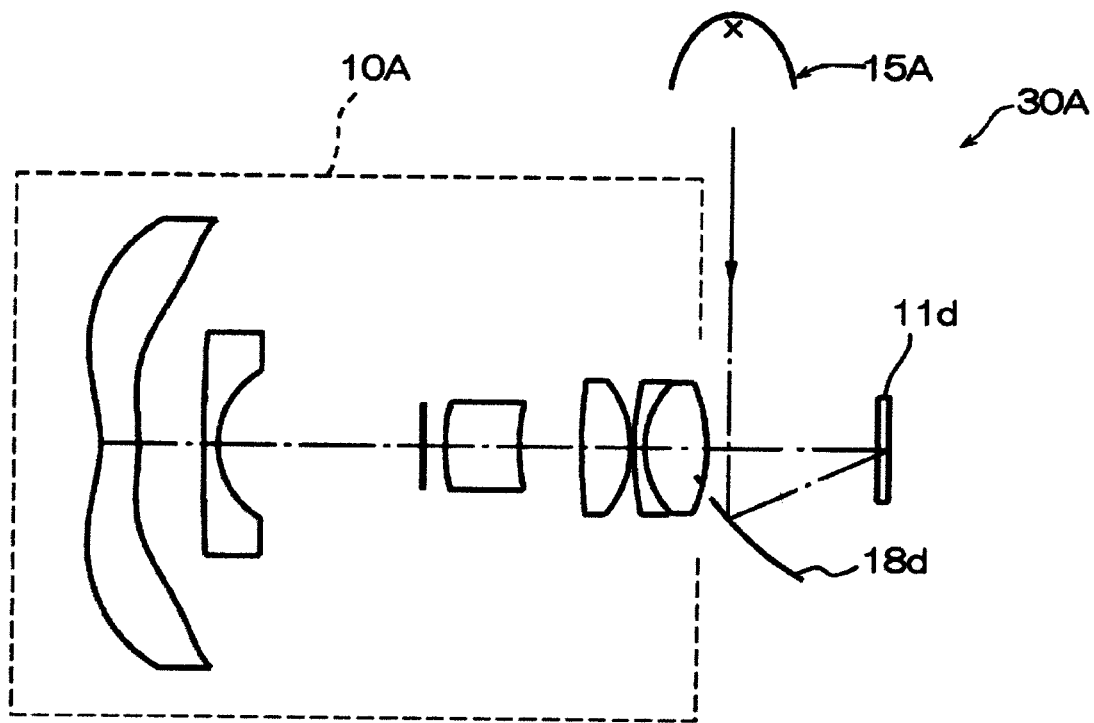
FIG. 20 is a diagram illustrating the structure of an illumination optical system of a projection-type display apparatus (single panel type).

FIG. 20 is a diagram illustrating the structure of an illumination optical system 30A and a projection lens 10A, which are a main part of a projection-type display apparatus of single panel type.

As illustrated in FIG. 20, the illumination optical system 30A includes a light source 15A for outputting white light, a reflective liquid crystal panel 11d, as a light valve, and a total reflection mirror 18d, which has a concave surface. Rays of light from the light source 15A are reflected and converged toward the direction of the reflective liquid crystal panel 11d by the total reflection mirror 18d. The white light output from the light source 15A enters, through the total reflection mirror 18d, the liquid crystal panel lid, and is optically modulated. Further, the modulated light is projected onto a screen, which is not illustrated, by the projection lens 10A.

The projection-type display apparatus of single panel type uses the projection lens of the present invention. Therefore, it is possible to reduce the size and the cost of the projection-type display apparatus, while maintaining a long back focus. Further, a wide angle and excellent projection performance are achieved.

Next, specific examples of the projection lens according to the present invention will be described. In the descriptions of the following examples, the same reference numerals are 'assigned to elements that have similar actions and effects.

EXAMPLE 1

As illustrated in FIG. 1, a projection lens in Example 1 includes six lenses $L_1$ through $L_6$, which are sequentially arranged from the magnification side of the projection lens, and an aperture stop (a mask may be provided instead of the aperture stop) 3. Further, the reduction side of the projection lens is substantially telecentric. FIG. 2 is a diagram illustrating a case of arranging a light reflection mirror, as the light deflection means 4 for deflecting light, between the second lens $L_2$ and the third lens $L_3$ in the projection lens illustrated in FIG. 1.

Specifically, first lens $L_1$, second lens $L_2$, an aperture stop (a mask may be provided instead of the aperture stop) 3, third lens $L_3$, fourth lens $L_4$, fifth lens $L_5$, and sixth lens $L_6$ are sequentially arranged from the magnification side of the projection lens. The first lens $L_1$ has small refractive power, and both surfaces of the first lens $L_1$ are aspheric. The second lens $L_2$ is a negative meniscus lens having a concave surface facing the reduction side of the projection lens. The third lens $L_3$ has small refractive power, and both surfaces of the third lens $L_3$ are aspheric. The fourth lens $L_4$ is a double convex lens. The fifth lens $L_5$ is a negative meniscus lens having a concave surface facing the reduction side. The sixth lens $L_6$ is a double convex lens. Further, the fifth lens $L_5$ and the sixth lens $L_6$ are cemented together to form a cemented lens of two lenses.

The shape of each aspheric surface is defined by the following aspheric equation, which represents an aspheric surface. The first lens $L_1$ and the third lens $L_3$, each including at least an aspheric surface, can achieve an advantageous effect of the present invention if at least a surface is aspheric. However, it is more desirable that both surfaces are aspheric.

$$Z = \frac{Y^2/R}{1 + \sqrt{1 - K \times Y^2/R^2}} + \sum_{i=3}^{12} A_i Y^i, \text{ where}$$ [Equation 1]

Z: length of a perpendicular from a point on an aspheric surface, the point away from optical axis by distance Y, to flat plane (flat plane perpendicular to the optical axis) in contact with the vertex of the aspheric surface, Y: distance from the optical axis, R: curvature radius of the aspheric surface in the vicinity of the optical axis, K: eccentricity, and $A_i$: aspheric coefficient (i=3 through 12).

Further, the projection lens in Example 1 satisfies the following formulas (1) through (7), (1') through (7'), (1") through (4"), and (6").

Further, an image display plane 1 of a light valve and a filter 2 (various kinds of filters) are illustrated, in FIG. 1. Ina modified example of the projection lens of Example 1, an air space in which a light reflection mirror 4 for deflecting light is arrangeable is provided between the second lens $L_2$ and the third lens $L_3$ (stop 3), as illustrated in FIG. 2. The projection lens is structured in such a manner that the reduction side is telecentric.

Table 1 shows data about the projection lens in Example 1. Table 1 shows curvature radius R of each lens surface (normalized by assuming the focal length to be 1; same in the following examples), the center thickness D of each lens and air space D between lenses (normalized by assuming the focal length to be 1, same in the following examples) (hereinafter, the center thickness D and the air space D are referred to as "axial surface distance"), and refractive index $N_d$ and Abbe number $v_d$ of each lens for d-line. In Table 1, and the following tables, surface numbers start from the magnification side of the projection lens. Further, mark "*" is attached to the right side of the surface number of an aspheric surface. In Example 1, and the following Examples 2 through 6, the tables show curvature radius R of an aspheric surface on optical axis Z. However, in the diagrams illustrating the structure of the lenses corresponding to the examples, a line indicating the curvature radius R is not always drawn from an intersection with optical axis Z to make the diagrams easily recognizable.

Further, Table 2 shows aspheric coefficients K, $A_3$ through $A_{12}$ for the aspheric surfaces.

TABLE 1

| SURFACE NUMBER | CURVATURE RADIUS (R) | DISTANCE (D) | REFRACTIVE INDEX (Nd) | ABBE NUMBER (vd) |
|---|---|---|---|---|
| OBJ | ∞ | 111.85 | | |
| 1 * | −2.865 | 1.05 | 1.491000 | 57.6 |
| 2 * | −6.094 | 1.80 | | |
| 3 | 56.155 | 0.40 | 1.804000 | 46.6 |
| 4 | 2.366 | 5.70 | | |
| 5 (MASK) | ∞ | 0.62 | | |
| 6 * | 5.826 | 2.07 | 1.631800 | 23.2 |
| 7 * | 7.899 | 1.74 | | |
| 8 | 17.845 | 1.38 | 1.517400 | 52.4 |
| 9 | −2.851 | 0.10 | | |
| 10 | 8.993 | 0.29 | 1.846700 | 23.8 |
| 11 | 2.601 | 1.73 | | |
| 12 | −4.620 | 4.22 | | |
| 13 | ∞ | 0.31 | 1.487500 | 70.2 |
| 14 | ∞ | | | |

* ASPHERIC SURFACE

TABLE 2

ASPHERIC COEFFICIENT

| SURFACE NUMBER | K | $A_3$ | $A_4$ | $A_5$ | $A_6$ |
|---|---|---|---|---|---|
| 1 | 0.00000 | 6.19881E−02 | −7.85767E−03 | 1.31173E−03 | −1.98670E−04 |
| 2 | 0.00000 | 2.34938E−02 | 1.20264E−02 | −2.19444E−03 | −1.41495E−04 |
| 6 | 1.00000 | 0.00000E+00 | 3.19509E−03 | 0.00000E+00 | 1.75280E−02 |
| 7 | 1.00000 | 0.00000E+00 | 3.27452E−02 | 0.00000E+00 | 2.64792E−03 |

| SURFACE NUMBER | $A_7$ | $A_8$ | $A_9$ | $A_{10}$ | $A_{11}$ | $A_{12}$ |
|---|---|---|---|---|---|---|
| 1 | 4.81179E−06 | −3.54502E−06 | 2.35813E−06 | −4.24493E−07 | 3.30411E−08 | −9.75840E−10 |
| 2 | 1.06233E−05 | 1.92512E−06 | 8.93649E−07 | −1.93273E−07 | 1.41346E−08 | −3.91085E−10 |
| 6 | 0.00000E+00 | −1.22542E−02 | 0.00000E+00 | 3.02798E−03 | 0.00000E+00 | 0.00000E+00 |
| 7 | 0.00000E+00 | 3.54601E−03 | 0.00000E+00 | −6.94095E−04 | 0.00000E+00 | 0.00000E+00 |

In Example 1, values corresponding to the formulas (1) through (7), (1') through (7'), (1") through (4"), and (6") are shown in Table 13, which will be described later. Example 1 satisfies all of the formulas.

EXAMPLE 2

Figure 3:
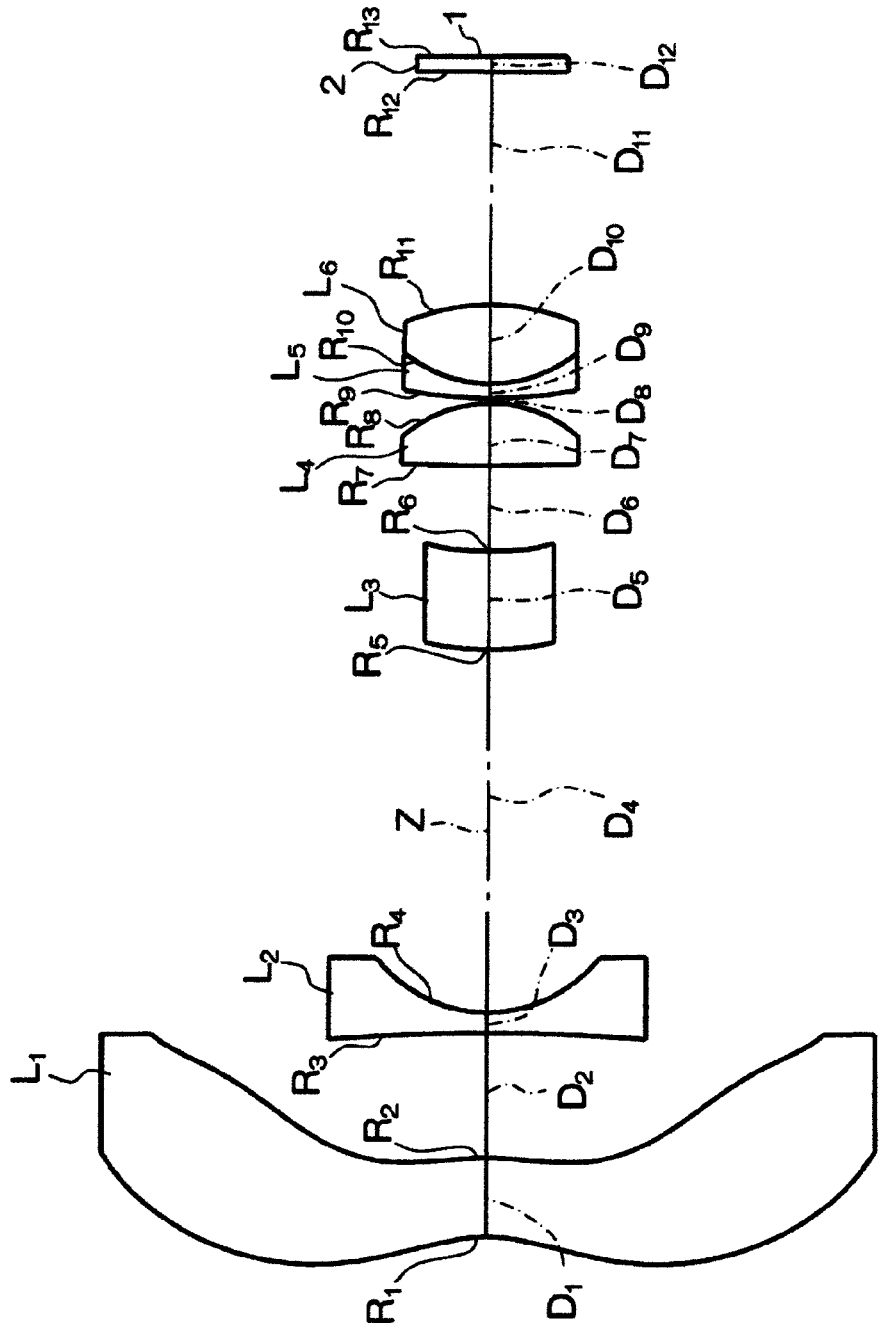
FIG. 3 is a diagram illustrating the structure of a projection lens in Example 2 of the present invention.

FIG. 3 illustrates the structure of the projection lens in Example 2. The structure of the projection lens in Example 2 is substantially similar to the projection lens in Example 1. However, Example 2 differs in that the second lens $L_2$ is a double concave lens, and that an aperture stop (mask) 3 is not arranged on optical axis Z. Further, FIG. 4 is a diagram illustrating a modified example of Example 2. In the modified example, a light reflection mirror, as a light deflection means 4 for deflecting light, is arranged between the second lens $L_2$ and the third lens $L_3$ of the projection lens illustrated in FIG. 3.

Table 3 shows data about the projection lens in Example 2. Table 3 shows curvature radius R of each lens surface, the axial surface distance D of each lens, and refractive index $N_d$ and Abbe number $v_d$ of each lens for d-line. Further, Table 4 shows aspheric coefficients K, $A_3$ through $A_{12}$ for the aspheric surfaces.

TABLE 3

| SURFACE NUMBER | CURVATURE RADIUS (R) | DISTANCE (D) | REFRACTIVE INDEX (Nd) | ABBE NUMBER (vd) |
|---|---|---|---|---|
| OBJ | ∞ | 113.44 | | |
| 1 * | −2.621 | 1.57 | 1.491000 | 57.6 |
| 2 * | −5.413 | 2.50 | | |
| 3 | −37.638 | 0.41 | 1.729200 | 54.7 |
| 4 | 2.777 | 7.19 | | |
| 5 * | 7.510 | 1.95 | 1.631800 | 23.2 |
| 6 * | 13.669 | 1.69 | | |
| 7 | 44.503 | 1.25 | 1.497000 | 81.5 |
| 8 | −2.579 | 0.10 | | |
| 9 | 8.792 | 0.29 | 1.903700 | 31.3 |
| 10 | 2.667 | 1.56 | 1.438800 | 94.9 |
| 11 | −4.141 | 4.61 | | |
| 12 | ∞ | 0.31 | 1.487500 | 70.2 |
| 13 | ∞ | | | |

* ASPHERIC SURFACE

TABLE 4

ASPHERIC COEFFICIENT

| SURFACE NUMBER | K | $A_3$ | $A_4$ | $A_5$ | $A_6$ |
|---|---|---|---|---|---|
| 1 | 0.00000 | 5.20081E−02 | −1.87581E−03 | −6.65711E−05 | −1.44665E−04 |
| 2 | 0.00000 | 1.90144E−02 | 1.35013E−02 | −1.94540E−03 | −1.51362E−04 |
| 5 | 1.00000 | 0.00000E+00 | 7.03400E−03 | 0.00000E+00 | 1.09608E−02 |
| 6 | 1.00000 | 0.00000E+00 | 3.50423E−02 | 0.00000E+00 | −4.10959E−04 |

| SURFACE NUMBER | $A_7$ | $A_8$ | $A_9$ | $A_{10}$ | $A_{11}$ | $A_{12}$ |
|---|---|---|---|---|---|---|
| 1 | 2.44920E−05 | −3.42680E−06 | 1.62289E−06 | −3.39722E−07 | 2.86882E−08 | −8.35394E−10 |
| 2 | 5.80872E−06 | 1.41757E−06 | 8.03928E−07 | −1.62478E−07 | 1.22725E−08 | −3.34799E−10 |
| 5 | 0.00000E+00 | −6.68518E−03 | 0.00000E+00 | 1.52312E−03 | 0.00000E+00 | 0.00000E+00 |
| 6 | 0.00000E+00 | 6.42895E−03 | 0.00000E+00 | −8.26772E−04 | 0.00000E+00 | 0.00000E+00 |

In Example 2, values corresponding to the formulas (1) through (7), (1') through (7'), (1") through (4"), and (6") are shown in Table 13, which will be described later. Example 2 satisfies all of the formulas.

EXAMPLE 3

Figure 5:
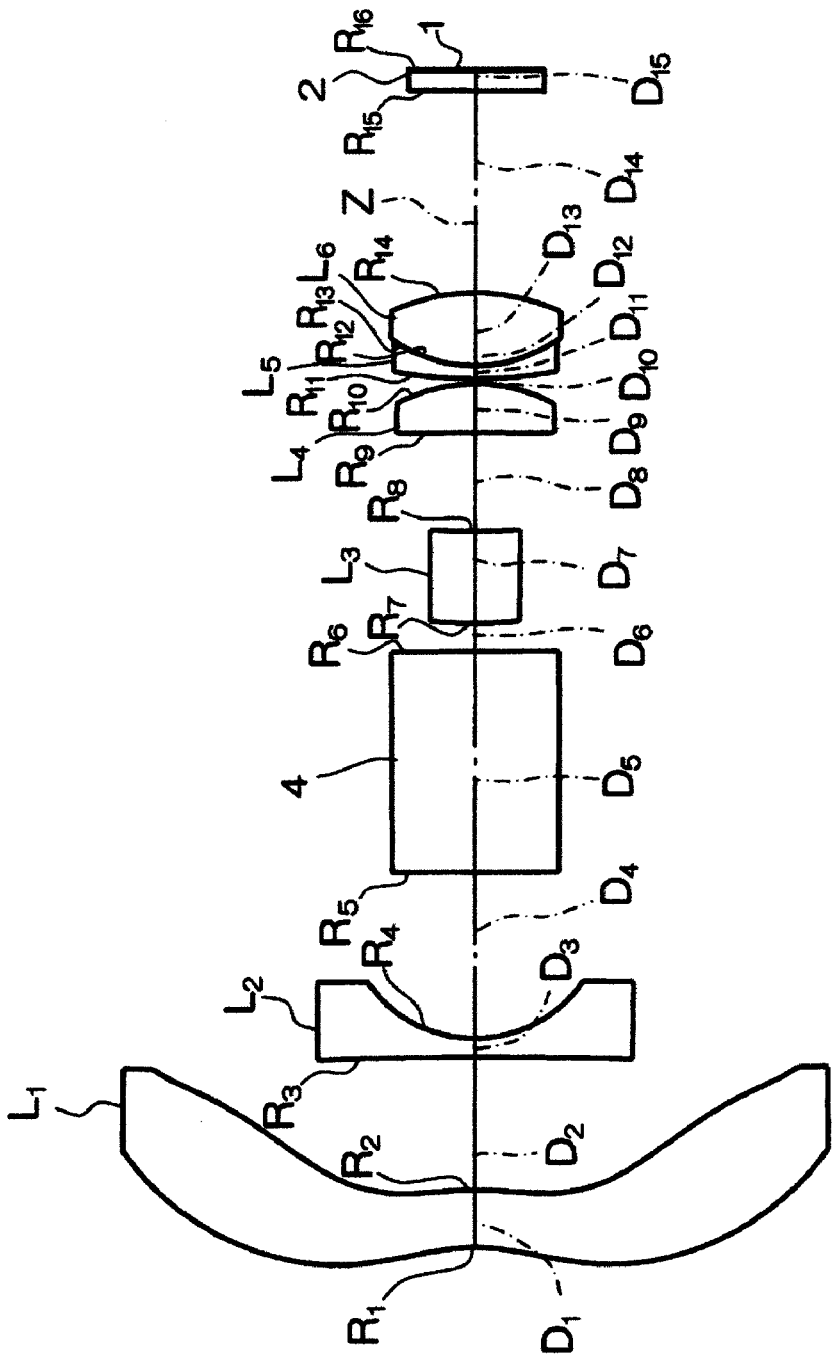
FIG. 5 is a diagram illustrating the structure of a projection lens in Example 3.

FIG. 5 illustrates the structure of the projection lens in Example 3. The structure of the projection lens in Example 3 is substantially similar to the projection lens in Example 2. However, Example 3 differs in that the fourth lens $L_4$ is a positive meniscus lens having a convex surface facing the reduction side, and that a light reflection prism, as a light deflection means 4, is arranged between the second lens $L_2$ and the third lens L, and that the fifth lens $L_5$ and the sixth lens $L_6$ are arranged close to each other with a very small distance therebetween. Since the light reflection prism is used as the light deflection means 4, it is possible to reduce the entire length, compared with the examples illustrated in FIGS. 2 and 4, in which a light reflection mirror is used as the light deflection means 4.

The projection lens illustrated in FIG. 6 is a modified example of the projection lens of Example 3. In the projection lens illustrated in FIG. 6, a light reflection prism, as a light deflection means 4 for deflecting light, is arranged between the second lens $L_2$ and the third lens $L_3$ of the projection lens illustrated in FIG. 5. In the projection lens illustrated in FIG. 6, the first lens $L_1$ has a non-circular shape including an effective rays passing area. Specifically, a part of the first lens $L_1$ is cut, and the first lens $L_1$ is not rotary symmetric. Accordingly, the size of the lens system is greatly reducible.

Table 5 shows data about the projection lens in Example 3. Table 5 shows curvature radius R of each lens surface, the axial surface distance D of each lens, and refractive index $N_d$ and Abbe number $v_d$ of each lens for d-line. Further, Table 6 shows aspheric coefficients K, $A_3$ through $A_{12}$ for the aspheric surfaces.

TABLE 5

| SURFACE NUMBER | CURVATURE RADIUS (R) | DISTANCE (D) | REFRACTIVE INDEX (Nd) | ABBE NUMBER (vd) |
|---|---|---|---|---|
| OBJ | ∞ | 112.87 | | |
| 1 * | −2.919 | 1.25 | 1.491000 | 57.6 |
| 2 * | −5.748 | 2.88 | | |
| 3 | −95.171 | 0.41 | 1.713000 | 53.9 |
| 4 | 2.783 | 3.59 | | |
| 5 | ∞ | 4.80 | 1.516300 | 64.1 |
| 6 | ∞ | 0.62 | | |
| 7 * | 12.284 | 1.98 | 1.846700 | 23.8 |
| 8 * | 30.325 | 2.15 | | |
| 9 | −169.476 | 1.07 | 1.497000 | 81.5 |
| 10 | −3.481 | 0.10 | | |
| 11 | 9.239 | 0.29 | 1.846700 | 23.8 |
| 12 | 3.081 | 0.01 | | |
| 13 | 3.076 | 1.59 | 1.516300 | 64.1 |
| 14 | −4.364 | 4.37 | | |
| 15 | ∞ | 0.53 | 1.487500 | 70.2 |
| 16 | ∞ | | | |

* ASPHERIC SURFACE

TABLE 6

ASPHERIC COEFFICIENT

| SURFACE NUMBER | K | $A_3$ | $A_4$ | $A_5$ | $A_6$ |
|---|---|---|---|---|---|
| 1 | 0.00000 | 5.84977E−02 | −7.39995E−03 | 1.19496E−03 | −1.81294E−04 |
| 2 | 0.00000 | 2.24349E−02 | 1.24117E−02 | −2.05302E−03 | −1.35367E−04 |
| 7 | 1.00000 | 0.00000E+00 | −2.13273E−03 | 0.00000E+00 | 2.51331E−02 |
| 8 | 1.00000 | 0.00000E+00 | 1.72297E−02 | 0.00000E+00 | −6.23290E−03 |

| SURFACE NUMBER | $A_7$ | $A_8$ | $A_9$ | $A_{10}$ | $A_{11}$ | $A_{12}$ |
|---|---|---|---|---|---|---|
| 1 | 6.14067E−06 | −3.50686E−06 | 2.12260E−06 | −3.86485E−07 | 3.01796E−08 | −8.83288E−10 |
| 2 | 9.26551E−06 | 1.65931E−06 | 8.12913E−07 | −1.79551E−07 | 1.29104E−08 | −3.53993E−10 |
| 7 | 0.00000E+00 | −2.62955E−02 | 0.00000E+00 | 9.84411E−03 | 0.00000E+00 | 0.00000E+00 |
| 8 | 0.00000E+00 | 1.00535E−02 | 0.00000E+00 | −4.07938E−03 | 0.00000E+00 | 0.00000E+00 |

In Example 3, values corresponding to the formulas (1) through (7), (1') through (7'), (1") through (4"), and (6") are shown in Table 13, which will be described later. Example 3 satisfies all of the formulas.

EXAMPLE 4

As illustrated in FIG. 7, a projection lens in Example 4 includes eight lenses $L_1$ through $L_8$, which are sequentially arranged from the magnification side of the projection lens. Further, the reduction side of the projection lens is substantially telecentric. FIG. 8 is a diagram illustrating a case of arranging a light reflection mirror, as the light deflection means 4 for deflecting light, between the second lens $L_2$ and the third lens $L_3$ in the projection lens illustrated in FIG. 7.

Specifically, first lens $L_1$, second lens $L_2$, third lens $L_3$, fourth lens $L_4$, fifth lens $L_5$, sixth lens $L_6$, seventh lens $L_7$ and eighth lens $L_8$ are sequentially arranged from the magnification side of the projection lens. The first lens $L_1$ has small refractive power, and both surfaces of the first lens $L_1$ are aspheric. The second lens $L_2$ is a negative meniscus lens having a concave surface facing the reduction side of the projection lens. The third lens $L_3$ is a double convex lens. The fourth lens $L_4$ is a double concave lens. The fifth lens $L_5$ is a double convex lens. The sixth lens $L_6$ is a double convex lens. The seventh lens $L_7$ is a negative meniscus lens having a concave surface facing the reduction side. The eighth lens $L_8$ is a double convex lens. Further, the fourth lens $L_4$ and the fifth lens $L_5$ are cemented together to form a cemented lens of two lenses. Further, the seventh lens $L_7$ and the eighth lens $L_8$ are cemented together to form a cemented lens of two lenses.

The shape of each aspheric surface is defined by the aforementioned aspheric equation. The first lens $L_1$, which includes at least an aspheric surface, can achieve an advantageous effect of the present invention if at least a surface is aspheric. However, it is more desirable that both surfaces are aspheric.

Table 7 shows data about the projection lens in Example 4. Table 7 shows curvature radius R of each lens surface, the axial surface distance D of each lens, and refractive index $N_d$ and Abbe number $v_d$ of each lens for d-line. Further, Table 8 shows aspheric coefficients K, $A_3$ through $A_{12}$ for the aspheric surfaces.

TABLE 7

| SURFACE NUMBER | CURVATURE RADIUS (R) | DISTANCE (D) | REFRACTIVE INDEX (Nd) | ABBE NUMBER (vd) |
|---|---|---|---|---|
| OBJ | ∞ | 113.75 | | |
| 1 * | −3.370 | 1.19 | 1.491000 | 57.6 |
| 2 * | −7.366 | 4.14 | | |
| 3 | 68.327 | 0.46 | 1.804000 | 46.6 |
| 4 | 3.461 | 8.27 | | |
| 5 | 16.618 | 2.05 | 1.808100 | 22.8 |
| 6 | −3.406 | 0.01 | | |
| 7 | −3.268 | 0.65 | 1.834800 | 42.7 |
| 8 | 2.235 | 1.24 | 1.517400 | 52.4 |
| 9 | −6.550 | 1.79 | | |
| 10 | 13.392 | 1.53 | 1.497000 | 81.5 |
| 11 | −3.893 | 0.11 | | |
| 12 | 9.062 | 0.33 | 1.846700 | 23.8 |
| 13 | 2.918 | 1.84 | 1.589100 | 61.1 |
| 14 | −10.177 | 5.49 | | |
| 15 | ∞ | 0.35 | 1.487500 | 70.2 |
| 16 | ∞ | 0.00 | | |

* ASPHERIC SURFACE

TABLE 8

ASPHERIC COEFFICIENT

| SURFACE NUMBER | K | $A_3$ | $A_4$ | $A_5$ | $A_6$ |
|---|---|---|---|---|---|
| 1 | 0.00000 | 3.97027E−02 | −2.09747E−03 | 1.23101E−04 | −7.38833E−05 |
| 2 | 0.00000 | 2.38923E−02 | 4.95757E−03 | −9.10329E−04 | −3.87022E−05 |

| SURFACE NUMBER | $A_7$ | $A_8$ | $A_9$ | $A_{10}$ | $A_{11}$ | $A_{12}$ |
|---|---|---|---|---|---|---|
| 1 | 7.41497E−06 | −1.66737E−06 | 7.63020E−07 | −1.28059E−07 | 9.06499E−09 | −2.35246E−10 |
| 2 | 4.04932E−06 | 2.66523E−07 | 2.64722E−07 | −5.57573E−08 | 3.87789E−09 | −9.42789E−11 |

In Example 4, values corresponding to the formulas (1) through (4), (6), (1') through (4'), (6'), (1") through (4"), and (6") are shown in Table 13, which will be described later. Example 4 satisfies all of the formulas.

EXAMPLE 5

Figure 9:
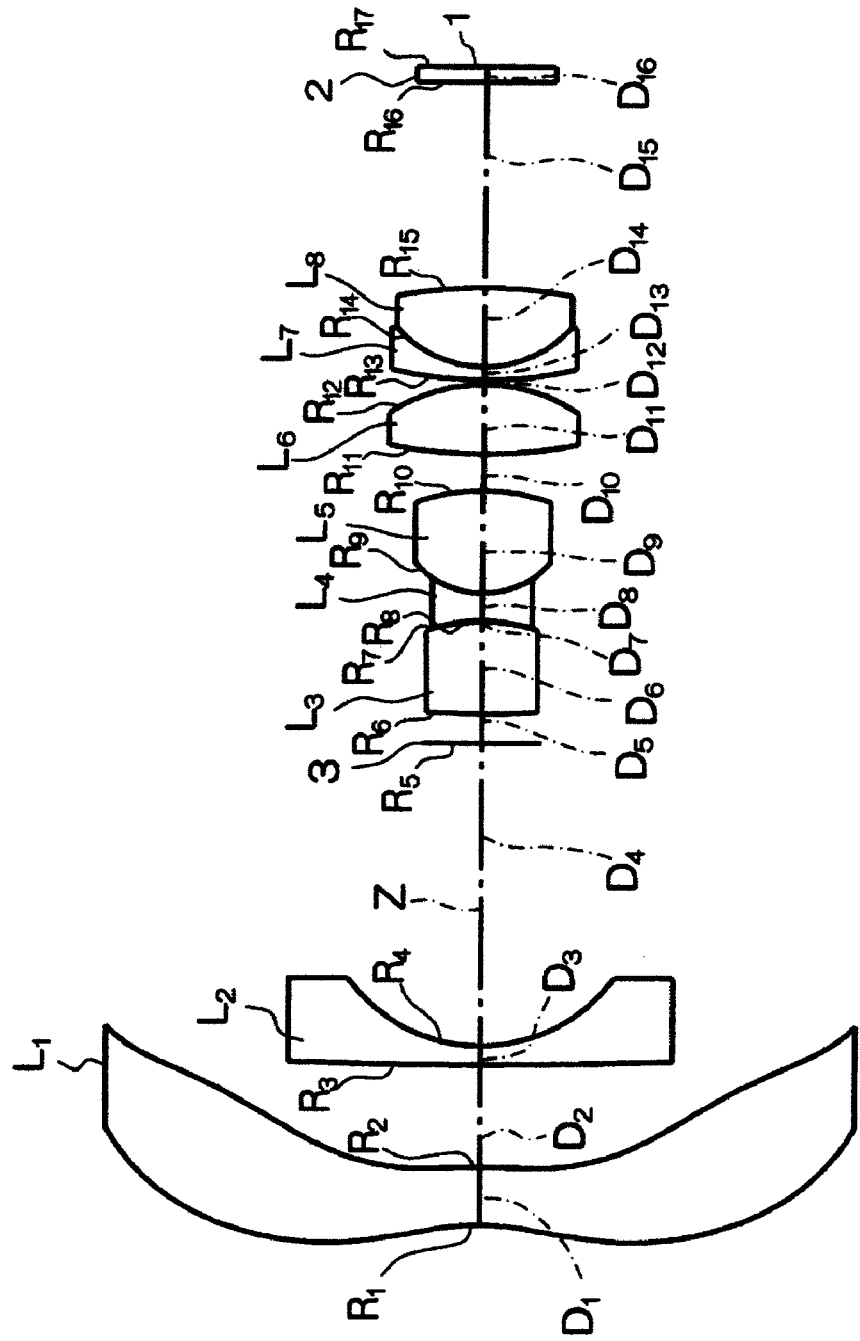
FIG. 9 is a diagram illustrating the structure of a projection lens in Example 5.

FIG. 9 illustrates the structure of the projection lens in Example 5. The structure of the projection lens in Example 5 is substantially similar to the projection lens in Example 4. However, Example 5 differs in that an aperture stop (a mask may be provided instead of the aperture stop) 3 is provided between the second lens. $L_2$ and the third lens $L_3$ (in the vicinity of the reduction side surface of the third lens $L_3$).

The projection lens illustrated in FIG. 10 is a modified example of the projection lens of Example 5. In the projection lens illustrated in FIG. 10, a light reflection mirror, as a light deflection means 4 for deflecting light, is arranged between the second lens $L_2$ and the third lens $L_3$ of the projection lens. In the projection lens illustrated in FIG. 10, each of the first lens $L_1$ and the second lens $L_2$ has a non-circular shape including an effective rays passing area. Specifically, a part of the first lens $L_1$ and a part of the second lens $L_2$ are cut, and the first lens $L_1$ and the second lens $L_2$ are not rotary symmetric. Accordingly, the size of the lens system is greatly reducible.

Table 9 shows data about the projection lens in Example 5. Table 9 shows curvature radius R of each lens surface, the axial surface distance D of each lens, and refractive index $N_d$ and Abbe number $v_d$ of each lens for d-line. Further, Table 10 shows aspheric coefficients K, $A_3$ through $A_{12}$ for the aspheric surfaces.

TABLE 9

| SURFACE NUMBER | CURVATURE RADIUS (R) | DISTANCE (D) | REFRACTIVE INDEX (Nd) | ABBE NUMBER (vd) |
|---|---|---|---|---|
| OBJ | ∞ | 111.59 | | |
| 1 * | −3.890 | 1.38 | 1.491000 | 57.6 |
| 2 * | −11.401 | 2.42 | | |
| 3 | 135.012 | 0.45 | 1.804000 | 46.6 |
| 4 | 3.791 | 7.13 | | |
| 5 (MASK) | ∞ | 0.69 | | |
| 6 | 21.734 | 2.16 | 1.846700 | 23.8 |
| 7 | −4.436 | 0.05 | | |
| 8 | −3.466 | 0.63 | 1.804000 | 46.6 |
| 9 | 2.102 | 2.41 | 1.517400 | 52.4 |
| 10 | −4.642 | 0.87 | | |
| 11 | 11.342 | 1.63 | 1.487500 | 70.2 |
| 12 | −3.961 | 0.11 | | |

TABLE 9-continued

| SURFACE NUMBER | CURVATURE RADIUS (R) | DISTANCE (D) | REFRACTIVE INDEX (Nd) | ABBE NUMBER (vd) |
|---|---|---|---|---|
| 13 | 9.301 | 0.32 | 1.846700 | 23.8 |
| 14 | 2.679 | 1.89 | 1.589100 | 61.1 |
| 15 | −10.650 | 4.84 | | |
| 16 | ∞ | 0.35 | 1.487500 | 70.2 |
| 17 | ∞ | 0.00 | | |

* ASPHERIC SURFACE

TABLE 10

ASPHERIC COEFFICIENT

| SURFACE NUMBER | K | $A_3$ | $A_4$ | $A_5$ | $A_6$ |
|---|---|---|---|---|---|
| 1 | 0.00000 | 3.35914E−02 | −1.88913E−03 | 8.87693E−05 | −6.99848E−05 |
| 2 | 0.00000 | 1.77300E−02 | 4.59329E−03 | −9.11225E−04 | −3.11391E−05 |

| SURFACE NUMBER | $A_7$ | $A_8$ | $A_9$ | $A_{10}$ | $A_{11}$ | $A_{12}$ |
|---|---|---|---|---|---|---|
| 1 | 9.46003E−06 | −2.07275E−06 | 8.57055E−07 | −1.48805E−07 | 1.09866E−08 | −2.90649E−10 |
| 2 | 4.78513E−06 | 1.81631E−07 | 2.92057E−07 | −6.42046E−08 | 4.69994E−09 | −1.16483E−10 |

In Example 5, values corresponding to the formulas (1) through (4), (6), (1') through (4'), (6'), (1") through (4"), and (6") are shown in Table 13, which will be described later. Example 5 satisfies all of the formulas.

EXAMPLE 6

FIG. 11 illustrates the structure of the projection lens in Example 6. The structure of the projection lens in Example 6 is substantially similar to the projection lens in Example 4. However, Example 6 differs in that a light reflection prism, as a light deflection means 4 for deflecting light, is arranged between the second lens $L_2$ and the third lens $L_3$, and that an aperture stop (a mask may be provided instead of the aperture stop) 3 is arranged between the fifth lens $L_5$ and the sixth lens $L_6$. Further, in Example 6, the fourth lens $L_4$ and the fifth lens $L_5$ are not cemented together, and the seventh lens $L_7$ and the eighth lens $L_8$ are not cemented together. They are arranged close to each other with a very small distance therebetween. Since the light reflection prism is used as the light deflection means 4, it is possible to reduce the entire length, compared with the projection lenses illustrated in FIGS. 8 and 10, in which the light reflection mirror is used as the light deflection means 4.

The projection lens illustrated in FIG. 12 is a modified example of the projection lens of Example 6. In the projection lens illustrated in FIG. 12, a light reflection prism, as the light deflection means 4 for deflecting light, is arranged between the second lens $L_2$ and the third lens $L_3$ of the projection lens. In the projection lens illustrated in FIG. 12, the first lens $L_1$ has a non-circular shape including an effective rays passing area. Specifically, a part of the first lens $L_1$ is cut, and the first lens $L_1$ is not rotary symmetric. Accordingly, the size of the lens system is greatly reducible.

Table 11 shows data about the projection lens in Example 6. Table 11 shows curvature radius R of each lens surface, the axial surface distance D of each lens, and refractive index $N_d$ and Abbe number $v_d$ of each lens for d-line. Further, Table 12 shows aspheric coefficients K, $A_3$ through $A_{12}$ for the aspheric surfaces.

TABLE 11

| SURFACE NUMBER | CURVATURE RADIUS (R) | DISTANCE (D) | REFRACTIVE INDEX (Nd) | ABBE NUMBER (vd) |
|---|---|---|---|---|
| OBJ | ∞ | 112.25 | | |
| 1 * | −4.437 | 1.34 | 1.491000 | 57.6 |
| 2 * | −13.212 | 4.60 | | |
| 3 | 46.534 | 0.45 | 1.804000 | 46.6 |
| 4 | 2.907 | 2.82 | | |
| 5 | ∞ | 5.35 | 1.516300 | 64.1 |
| 6 | ∞ | 0.69 | | |
| 7 | 14.206 | 2.02 | 1.846700 | 23.8 |
| 8 | −3.305 | 0.01 | | |
| 9 | −3.368 | 0.64 | 1.834800 | 42.7 |
| 10 | 2.054 | 0.01 | | |
| 11 | 2.058 | 1.12 | 1.487500 | 70.2 |
| 12 | −4.818 | 0.64 | | |
| 13 (MASK) | ∞ | 1.51 | | |
| 14 | 21.199 | 1.28 | 1.497000 | 81.5 |
| 15 | −3.880 | 0.11 | | |
| 16 | 9.683 | 0.32 | 1.846700 | 23.8 |
| 17 | 3.305 | 0.01 | | |
| 18 | 3.316 | 1.71 | 1.516300 | 64.1 |
| 19 | −6.258 | 5.26 | | |
| 20 | ∞ | 0.56 | 1.487500 | 70.2 |
| 21 | ∞ | 0.00 | | |

* ASPHERIC SURFACE

TABLE 12

ASPHERIC COEFFICIENT

| SURFACE NUMBER | K | $A_3$ | $A_4$ | $A_5$ | $A_6$ |
|---|---|---|---|---|---|
| 1 | 0.00000 | 2.87398E−02 | −1.02343E−03 | 1.73097E−04 | −8.55419E−05 |
| 2 | 0.00000 | 1.68641E−02 | 5.21021E−03 | −8.75568E−04 | −3.37791E−05 |

| SURFACE NUMBER | $A_7$ | $A_8$ | $A_9$ | $A_{10}$ | $A_{11}$ | $A_{12}$ |
|---|---|---|---|---|---|---|
| 1 | 7.06320E−06 | −1.79810E−06 | 8.63567E−07 | −1.45276E−07 | 1.03549E−08 | −2.72319E−10 |
| 2 | 4.40447E−06 | 1.29584E−07 | 2.67821E−07 | −5.95356E−08 | 4.42969E−09 | −1.09137E−10 |

In Example 6, values corresponding to the formulas (1) through (4), (6), (1') through (4'), (6'), (1") through (4"), and (6") are shown in Table 13, which will be described later. Example 6 satisfies all of the formulas.

TABLE 13

|  | FORMULA(1), (1"), (1''') Bf/f | FORMULA(2), (2'), (2") \|fa/f\| | FORMULA(3), (3'), (3"), (3''') fb/f | FORMULA(4), (4'), (4") d/f | FORMULA (5), (5') $v_3$ | FORMULA(6), (6'), (6") \|$f_1/f$\| | FORMULA (7), (7') \|$f_3/f$\| |
|---|---|---|---|---|---|---|---|
| EXAMPLE 1 | 4.4 | 1.46 | 4.1 | 6.3 | 23.2 | 12.3 | 25.3 |
| EXAMPLE 2 | 4.8 | 1.59 | 4.5 | 7.2 | 23.2 | 12.7 | 23.5 |
| EXAMPLE 3 | 4.7 | 1.54 | 4.4 | 7.4 | 23.8 | 14.1 | 23.2 |
| EXAMPLE 4 | 5.7 | 1.65 | 4.8 | 8.3 | — | 14.0 | — |
| EXAMPLE 5 | 5.1 | 1.57 | 5.0 | 7.8 | — | 12.8 | — |
| EXAMPLE 6 | 5.6 | 1.62 | 4.9 | 7.0 | — | 14.3 | — |

FIGS. 13-*i* through 13-*iv* are diagrams illustrating aberrations of the projection lens in Example 1. Specifically, FIG. 13-*i* illustrates spherical aberration, and FIG. 13-*ii* illustrates astigmatism, and FIG. 13-*iii* illustrates distortion, and FIG. 13-*iv* illustrates lateral chromatic aberration. Similarly, FIGS. 14-*i* through 14-*iv*, 15-*i* through 15-*iv*, 16-*i* through 16-*iv*, 17-*i* through 17-*iv*, and 18-*i* through 18-*iv* illustrate aberrations for Examples 2 through 6, respectively. In the diagrams illustrating aberrations, ω represents a half angle of view. In the diagrams illustrating spherical aberration, aberrations for d-line, F-line and C-line are illustrated. In the diagrams illustrating lateral chromatic aberration, aberrations of F-line and C-line with respect to d-line are illustrated. As FIGS. 13-*i* through 13-*iv*, 14-*i* through 14-*iv*, and 15-*i* through 15-*iv* illustrate, each aberration is corrected in an excellent manner in the projection lenses of Examples 1 through 3, and the half angle of view is in the range of 55.5 to 55.8 degrees, and F-number is in the range of 2.00 to 2.40. Further, as FIGS. 16-*i* through 16-*iv*, 17-*i* through 17-*iv*, and 18-*i* through 18-*iv* illustrate, each aberration is corrected in an excellent manner in the projection lenses of Examples 4 through 6, and the half angle of view is in the range of 57.5 to 58.0 degrees, and F-number is in the range of 2.00 to 2.40. Therefore, the projection lens in each of all the examples has a wide angle and a small F-number (so-called bright lens).

Further, a sufficient back focus (please refer to numerical values corresponding to the formula (1)) and a sufficient air space between lenses for inserting a light deflection means (please refer to numerical values corresponding to the formula (4)) are maintained.

The projection lens of the present invention is not limited to the aforementioned examples, and various modifications are possible. For example, the curvature radius R of each lens and a distance between lenses (or lens thickness) D may be changed in an appropriate manner.

Further, the structure of the projection-type display apparatus of the present invention is not limited to the aforementioned structure. The projection-type display apparatus including the projection lens of the present invention may be structured in various manners. For example, the light valve may be a transmissive or reflective liquid crystal display device, a micromirror device (for example, a digital micromirror device manufactured by Texas Instruments Incorporated), or, the like. The micromirror device includes a multiplicity of micro mirrors arranged on a substantially flat plane, and the inclination of each of the multiplicity of micro mirrors is changeable. Further, the structure of the illumination optical system may be adopted in an appropriate manner based on the type of the light valve.

What is claimed is:

1. A projection lens comprising:
   a first lens having at least an aspheric surface;
   a second lens having a concave surface facing the reduction side of the projection lens, and having negative refractive power;
   a third lens;
   a fourth lens having a convex surface facing the reduction side, and having positive refractive power;
   a fifth lens having a concave surface facing the reduction side, and having negative refractive power; and
   a sixth lens having a convex surface facing the reduction side, and having positive refractive power, which are sequentially arranged from the magnification side of the projection lens,
   wherein the following formulas (1) and (2) are satisfied:

$$3.5 < Bf/f < 7.5 \quad (1); \text{ and}$$

$$1.2 < |fa/f| < 2.0 \quad (2), \text{ where}$$

f: focal length of the entire system of the projection lens,
   Bf: back focus in air of the entire system, and
   fa: combined focal length of lenses from the second lens to a most-reduction-side lens.

2. A projection lens, as defined in claim 1, wherein the following formula (5) is satisfied:

$$v_3 < 40 \quad (5), \text{ where}$$

$v_3$: Abbe number of the third lens for d-line.

3. A projection lens, as defined in claim 1, wherein the following formula (7) is satisfied:

$$10.0 < |f_3/f| \quad (7), \text{ where}$$

$f_3$: focal length of the third lens.

4. A projection lens, as defined in claim 1, wherein the following formula (3) is satisfied:

$$3.0 < fb/f < 6.5 \quad (3), \text{ where}$$

fb: combined focal length of three lenses from the reduction side.

5. A projection lens, as defined in claim 4, wherein the following formula (5) is satisfied:

$$v_3 < 40 \quad (5), \text{ where}$$

$v_3$: Abbe number of the third lens for d-line.

6. A projection lens, as defined in claim 4, wherein an air space between the second lens and the third lens is longest among air spaces in the projection lens, and
   wherein the following formula (4) is satisfied:

$$5.0 < d/f < 10.0 \quad (4), \text{ where}$$

d: air space between the reduction-side surface of the second lens and the magnification-side surface of the third lens.

7. A projection lens, as defined in claim 6, wherein the following formula (5) is satisfied:

$$v_3 < 40 \quad (5),$$ where $v_3$: Abbe number of the third lens for d-line.

8. A projection lens, as defined in claim 7, wherein the following formula (7) is satisfied:

$$10.0 < |f_3/f| \quad (7),$$ where $f_3$: focal length of the third lens.

9. A projection lens, as defined in claim 7, wherein at least a surface of the third lens is aspheric.

10. A projection lens, as defined in claim 9, wherein the following formula (6) is satisfied:

$$8.0 < |f_1/f| \quad (6),$$ where $f_1$: focal length of the first lens.

11. A projection lens, as defined in claim 10, wherein the following formula (7) is satisfied:

$$10.0 < |f_3/f| \quad (7),$$ where $f_3$: focal length of the third lens.

12. A projection lens, as defined in claim 11, wherein a light deflection means is inserted into the air space between the second lens and the third lens to deflect light.

13. A projection lens, as defined in claim 12, wherein the first lens has a non-circular shape including an effective rays passing area.

14. A projection-type display apparatus comprising:
a light source;
a light valve;
an illumination optical unit that guides rays output from the light source to the light valve; and
a projection lens, as defined in claim 13,
wherein the rays output from the light source are optically modulated by the light valve and projected onto a screen by the projection lens.

15. A projection lens comprising:
a first lens having at least an aspheric surface;
a second lens having a concave surface facing the reduction side of the projection lens, and having negative refractive power;
a third lens having positive refractive power;
a fourth lens having negative refractive power;
a fifth lens having positive refractive power;
a sixth lens having a convex surface facing the reduction side, and having positive refractive power;
a seventh lens having a concave surface facing the reduction side, and having negative refractive power; and
an eighth lens having a convex surface facing the reduction side, and having positive refractive power, which are sequentially arranged from the magnification side of the projection lens,
wherein the following formulas (1) and (2) are satisfied:

$$3.5 < Bf/f < 7.5 \quad (1);\text{ and}$$

$$1.2 < |fa/f| < 2.0 \quad (2),$$ where f: focal length of the entire system of the projection lens,
Bf: back focus in air of the entire system, and
fa: combined focal length of lenses from the second lens to a most-reduction-side lens.

16. A projection lens, as defined in claim 15, wherein the following formula (3) is satisfied:

$$3.0 < fb/f < 6.5 \quad (3),$$ where fb: combined focal length of three lenses from the reduction side.

17. A projection lens, as defined in claim 16, wherein an air space between the second lens and the third lens is longest among air spaces in the projection lens, and
wherein the following formula (4) is satisfied:

$$5.0 < d/f < 10.0 \quad (4),$$ where d: air space between the reduction-side surface of the second lens and the magnification-side surface of the third lens.

18. A projection lens, as defined in claim 17, wherein the following formula (6) is satisfied:

$$8.0 < |f_1/f| \quad (6),$$ where $f_1$: focal length of the first lens.

19. A projection lens, as defined in claim 18, wherein a light deflection means is inserted into the air space between the second lens and the third lens to deflect light.

20. A projection lens, as defined in claim 19, wherein the first lens has a non-circular shape including an effective rays passing area.

21. A projection-type display apparatus comprising:
a light source;
a light valve;
an illumination optical unit that guides rays output from the light source to the light valve; and
a projection lens, as defined in claim 19,
wherein the rays output from the light source are optically modulated by the light valve and projected onto a screen by the projection lens.

* * * * *